United States Patent
Aoki

(10) Patent No.: US 12,227,239 B2
(45) Date of Patent: Feb. 18, 2025

(54) STEERING CONTROL DEVICE, AND STEERING CONTROL METHOD

(71) Applicant: DENSO CORPORATION, Kariya (JP)

(72) Inventor: Takashi Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 199 days.

(21) Appl. No.: 17/934,073

(22) Filed: Sep. 21, 2022

(65) Prior Publication Data

US 2023/0017841 A1 Jan. 19, 2023

Related U.S. Application Data

(63) Continuation of application No. PCT/JP2021/002484, filed on Jan. 25, 2021.

(30) Foreign Application Priority Data

Mar. 25, 2020 (JP) .................................. 2020-054729

(51) Int. Cl.
*B62D 6/00* (2006.01)
*B62D 6/02* (2006.01)
*B62D 15/02* (2006.01)

(52) U.S. Cl.
CPC ............. *B62D 6/00* (2013.01); *B62D 15/025* (2013.01); *B62D 6/002* (2013.01); *B62D 6/02* (2013.01)

(58) Field of Classification Search
None
See application file for complete search history.

(56) References Cited

U.S. PATENT DOCUMENTS

| | | | | |
|---|---|---|---|---|
| 6,621,421 B2* | 9/2003 | Kuriya | ............... | B62D 15/0275 701/1 |
| 6,701,226 B2* | 3/2004 | Yamada | ................. | B60T 8/172 701/1 |
| 6,711,473 B2* | 3/2004 | Shimazaki | ........... | B62D 15/028 701/1 |
| 11,254,356 B2* | 2/2022 | Kato | ..................... | B60W 10/20 |
| 11,787,386 B2* | 10/2023 | Watanabe | ................ | B60D 1/62 701/41 |
| 11,851,117 B2* | 12/2023 | Aoki | .................... | B62D 15/025 |

(Continued)

FOREIGN PATENT DOCUMENTS

| | | | | |
|---|---|---|---|---|
| CN | 114194281 A | * | 3/2022 | ............. B62D 5/006 |
| CN | 115335275 A | * | 11/2022 | ........... B62D 15/025 |

(Continued)

*Primary Examiner* — Kevin R Steckbauer
(74) *Attorney, Agent, or Firm* — Maschoff Brennan

(57) ABSTRACT

A steering control device is configured to control steering of a vehicle by a steering actuator. The steering control includes a trajectory following control unit and an angle following control unit. The trajectory following control unit is configured to adjust a target angle of a steering angle given to a tire of the vehicle by a trajectory following control that causes a state quantity containing a position of the vehicle to follow a target trajectory. The angle following control unit is configured to adjust an instruction value that is given to the steering actuator and corresponds to an actual angle of the steering angle by an angle following control that causes the actual angle to follow the target angle. The trajectory following control unit is configured to forcibly set the target angle to be a fixed angle in a stop control period.

28 Claims, 23 Drawing Sheets

(56) References Cited

U.S. PATENT DOCUMENTS

| | | | | |
|---|---|---|---|---|
| 2001/0017591 A1* | 8/2001 | Kuriya | ............... | B62D 15/028 340/436 |
| 2002/0198634 A1* | 12/2002 | Shimazaki | ........... | B62D 15/028 701/1 |
| 2003/0009266 A1* | 1/2003 | Yamada | ............... | B62D 15/028 701/1 |
| 2006/0113119 A1* | 6/2006 | Dudeck | ............... | B62D 15/028 180/6.2 |
| 2010/0274474 A1* | 10/2010 | Takano | ............. | B62D 15/0275 340/932.2 |
| 2018/0118257 A1* | 5/2018 | Fujino | ................... | B62D 6/007 |
| 2020/0001855 A1* | 1/2020 | Watanabe | ................ | G01B 7/30 |
| 2020/0239066 A1* | 7/2020 | Kato | ................... | B62D 5/0466 |
| 2022/0081023 A1* | 3/2022 | Miyake | ............... | B62D 5/0469 |
| 2022/0348253 A1* | 11/2022 | Aoki | .................... | B62D 15/025 |
| 2023/0017841 A1* | 1/2023 | Aoki | .................... | B62D 15/025 |
| 2023/0249677 A1* | 8/2023 | Mizoguchi | ......... | B62D 15/0285 701/25 |

FOREIGN PATENT DOCUMENTS

| | | | | | |
|---|---|---|---|---|---|
| CN | 115335275 | B | * | 3/2024 | ........... B62D 15/025 |
| DE | 102019205165 | B4 | * | 6/2022 | ............ B62D 1/286 |
| EP | 3971057 | A1 | * | 3/2022 | ............. B62D 5/006 |
| EP | 3971057 | B1 | * | 3/2023 | ............. B62D 5/006 |
| JP | 2020001576 | A | * | 1/2020 | ........... B60D 1/245 |
| JP | 2021109569 | A | * | 8/2021 | ........... B62D 15/025 |
| JP | 2021154783 | A | * | 10/2021 | ........... B62D 15/025 |
| JP | 2022049970 | A | * | 3/2022 | ............. B62D 5/006 |
| JP | 7156329 | B2 | * | 10/2022 | ........... B62D 15/025 |
| JP | 7180144 | B2 | * | 11/2022 | ............ B60D 1/245 |
| JP | 7189060 | B2 | * | 12/2022 | ............ B60W 10/04 |
| WO | WO-2021145063 | A1 | * | 7/2021 | ........... B62D 15/025 |
| WO | WO-2021192572 | A1 | * | 9/2021 | ........... B62D 15/025 |

* cited by examiner

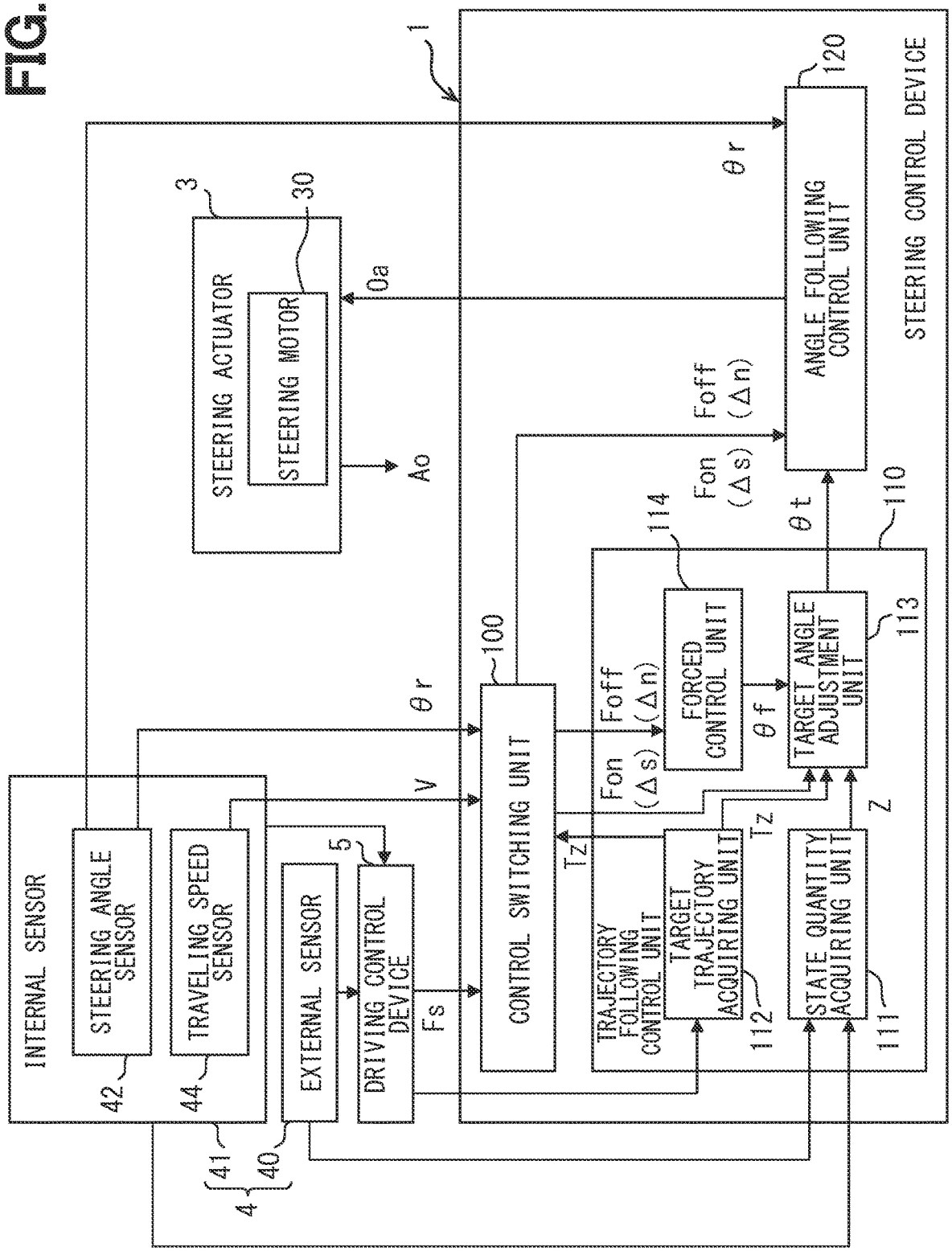

FIG. 3

| STARTING CONDITION | SATISFIED REQUIREMENT |
|---|---|
| Cs1 | TRAVELING SPEED V IS WITHIN ACCEPTABLE SPEED RANGE |
| Cs2 | ANGULAR VELOCITY OF ACTUAL ANGLE $\theta r$ IS WITHIN ACCEPTABLE ANGULAR VELOCITY RANGE |

FIG. 4

| CANCEL CONDITION | SATISFIED REQUIREMENT |
|---|---|
| Cr1 | TRAVELING SPEED V IS WITHIN CANCEL SPEED RANGE |
| Cr2 | STEERING FLAG Fs IS TRANSMITTED FROM DRIVING CONTROL DEVICE |
| Cr3 | DEVIATION IN TRAJECTORY IS EXPECTED |

STEERING CONTROL DEVICE, AND STEERING CONTROL METHOD

CROSS REFERENCE TO RELATED APPLICATION

The present application is a continuation application of International Patent Application No. PCT/JP2021/002484 filed on Jan. 25, 2021, which designated the U.S. and claims the benefit of priority from Japanese Patent Application No. 2020-054729 filed on Mar. 25, 2020. The entire disclosures of all of the above applications are incorporated herein by reference.

TECHNICAL FIELD

The present disclosure relates to a steering control technique to control steering of a vehicle by a steering actuator.

BACKGROUND

A technique is known as a steering control technique, in which the steering angle of the vehicle is decreased by a power steering motor after the vehicle stops to bring the steering angle closer to zero degrees at which the vehicle can travel straight.

SUMMARY

A first aspect of the present disclosure is a steering control device configured to control steering of a vehicle by a steering actuator. The steering control includes: a trajectory following control unit configured to adjust a target angle of a steering angle given to a tire of the vehicle by a trajectory following control that causes a state quantity containing a position of the vehicle to follow a target trajectory; and an angle following control unit configured to adjust an instruction value that is given to the steering actuator and corresponds to an actual angle of the steering angle by an angle following control that causes the actual angle to follow the target angle. The trajectory following control unit is configured to forcibly set the target angle to be a fixed angle in a stop control period which starts in response to a stop of the vehicle.

A second aspect of the present disclosure is a steering control device configured to control steering of a vehicle by a steering actuator. The steering control includes: a trajectory following control unit configured to adjust a target angle of a steering angle given to a tire of the vehicle by a trajectory following control that causes a state quantity containing a position of the vehicle to follow a target trajectory; and an angle following control unit configured to adjust an instruction value that is given to the steering actuator and corresponds to an actual angle of the steering angle by an angle following control that causes the actual angle to follow the target angle. The angle following control unit is configured to forcibly set the instruction value to be a fixed value in a stop control period which starts in response to a stop of the vehicle.

A third aspect of the present disclosure is a steering control method for controlling steering of a vehicle by a steering actuator. The steering control method includes: adjusting a target angle of a steering angle given to a tire of the vehicle by a trajectory following control that causes a state quantity containing a position of the vehicle to follow a target trajectory; and adjusting an instruction value that is given to the steering actuator and corresponds to an actual angle of the steering angle by an angle following control that causes the actual angle to follow the target angle. In the adjusting the target angle, the target angle is forcibly set to be a fixed angle in a stop control period which starts in response to a stop of the vehicle.

A fourth aspect of the present disclosure is a steering control method for controlling steering of a vehicle by a steering actuator. The steering control method includes: adjusting a target angle of a steering angle given to a tire of the vehicle by a trajectory following control that causes a state quantity containing a position of the vehicle to follow a target trajectory; and adjusting an instruction value that is given to the steering actuator and corresponds to an actual angle of the steering angle by an angle following control that causes the actual angle to follow the target angle. In the adjusting the instruction value, the instruction value is forcibly set to be a fixed value in a stop control period which starts in response to a stop of the vehicle.

A fifth aspect of the present disclosure is a computer program product configured to control steering of a vehicle by a steering actuator. The computer program product is stored on at least one non-transitory computer readable medium and includes instructions configured to, when executed by at least one processor, cause the at least one processor to: adjust a target angle of a steering angle given to a tire of the vehicle by a trajectory following control that causes a state quantity containing a position of the vehicle to follow a target trajectory; adjust an instruction value that is given to the steering actuator and corresponds to an actual angle of the steering angle by an angle following control that causes the actual angle to follow the target angle; and forcibly set the target angle to be a fixed angle in a stop control period which starts in response to a stop of the vehicle.

A sixth aspect of the present disclosure is a computer program product configured to control steering of a vehicle by a steering actuator. The computer program product is stored on at least one non-transitory computer readable medium and includes instructions configured to, when executed by at least one processor, cause the at least one processor to: adjust a target angle of a steering angle given to a tire of the vehicle by a trajectory following control that causes a state quantity containing a position of the vehicle to follow a target trajectory; adjust an instruction value that is given to the steering actuator and corresponds to an actual angle of the steering angle by an angle following control that causes the actual angle to follow the target angle; and forcibly set the instruction value to be a fixed value in a stop control period which starts in response to a stop of the vehicle.

BRIEF DESCRIPTION OF THE DRAWINGS

FIG. 2 is a block diagram showing a detail configuration of the steering control device according to the first embodiment.

FIG. 3 is a schematic diagram for explaining a control switching unit according to the first embodiment.

FIG. 4 is a schematic diagram for explaining the control switching unit according to the first embodiment.

EMBODIMENTS

Figure 1:
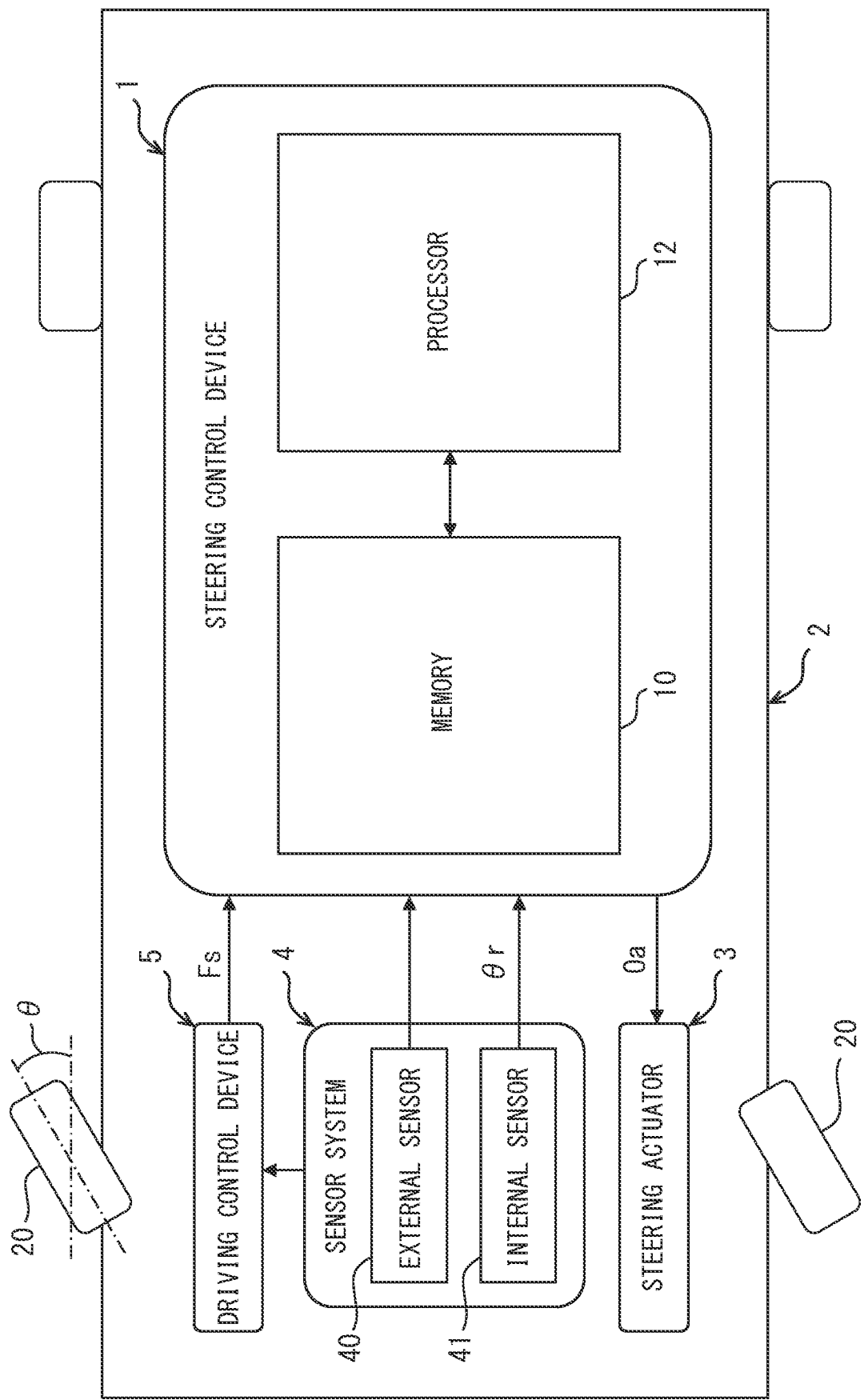
FIG. 1 is a block diagram showing an overall configuration of a steering control device according to a first embodiment.

When the steering angle is offset from 0 degrees at the next start of a stopped vehicle, the occupant may feel uncomfortable. Therefore, if the power steering motor is controlled so as to maintain the steering angle of the stopped vehicle, new problem may arise.

The problem is that the instruction value given to the power steering motor for holding the steering angle may fluctuate due to disturbances, which causes the steering angle to fluctuate. This is because, in a configuration in which the steering angle adjustment by the power steering motor is controlled along a target route determined based on the positional information of the vehicle, the input information from the sensor system that provides the positional information acts as a disturbance. The change in the steering angle of the stopped vehicle is also expected to be improved because it gives the occupants a sense of discomfort.

Hereinafter, a plurality of embodiments will be described with reference to the drawings. It should be noted that the same reference numerals are assigned to corresponding components in the respective embodiments, and overlapping descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

As shown in FIG. 1, a steering control device 1 according to a first embodiment is mounted in a vehicle 2. The vehicle is, for example, an advanced driving assistance vehicle or an automated driving vehicle configured to perform an automated driving control constantly or temporarily by the steering control device 1. In the vehicle 2, a steering angle θ of at least a pair of tires 20 (hereinafter, referred to as steering tires) with respect to a front-rear direction is adjusted according to an automatic steering control by the steering control device 1. The vehicle 2 is equipped with a steering actuator 3, a sensor system 4, and a driving control device 5 together with the steering control device 1.

The steering actuator 3 includes an electrical steering motor 30 shown in FIG. 2 and a reducing device (not shown). The steering actuator 3 may constitute a power steering system mechanically cooperating with the steering wheel (not shown) of the vehicle 2. The steering actuator 3 may constitute a steer-by-wire system which is mechanically disconnected but electrically connected with the steering wheel of the vehicle 2.

The steering actuator 3 generates the torque by the steering motor 30 in accordance with an instruction value Oa transmitted from the steering control device 1, and outputs the torque after amplifying it by the reducing device. The torque is transmitted from the steering actuator 3 to the steering tire 20, and thus the steering angle θ of the tire 20 shown in FIG. 1 is changed. The steering angle θ is given a positive (plus) value on the right side and a negative (minus) value on the left side with respect to the front-rear direction of the vehicle 2. Similarly, the instruction value Oa to the steering actuator 3 and the output value Ao from the steering actuator 3 are given positive and negative values.

As shown in FIGS. 1, 2, the sensor system 4 includes an external sensor 40 and an internal sensor 41. The external sensor 40 is configured to acquire information about the outside of the vehicle 2, which is the surrounding environment of the vehicle 2. The external sensor 40 may acquire the external information by detecting objects existing in the outside of the vehicle 2. The external sensor 40 of the detection type includes one or some of a camera, a LiDAR (Light Detection and Ranging/Laser Imaging Detection and Ranging), a radar, a sonar, and the like, for example. The external sensor 40 may acquire the external information by receiving a signal from an artificial satellite of a GNSS (Global Navigation Satellite System) present in the outside of the vehicle 2 or a signal from a roadside device of ITS (Intelligent Transport Systems). The external sensor 40 of the signal reception type is at least one of, for example, a GNSS receiver, a telematics receiver, and the like.

The internal sensor 41 is configured to acquire information about the inside of the vehicle 2, which is the internal environment of the vehicle 2. The internal sensor 41 may acquire the internal information by detecting a specific motion physical quantity in the inside of the vehicle 2. The physical quantity detection type internal sensor 41 includes at least two sensors 42, 44 such as a steering angle sensor 42, a traveling speed sensor 44, and a steering output sensor and an inertial sensor. The steering angle sensor 42 is configured to acquire an actual angle θr which is an actual steering angle θ of the steering tire 20. The traveling speed sensor 44 is configured to acquire a traveling speed V of the vehicle 2.

The driving control device 5 is connected with the sensor system 4 through at least one of LAN (Local Area Network), a wire harness, an internal bus, and the like. The driving control device 5 is an ECU (Electronic Control Unit) dedicated to an advanced driving assistance or an autonomous driving control for constant or temporal automated driving control of the vehicle 2 as an upper level control than the control of the steering control device 1. The automated driving mode and the manual driving mode can be switched therebetween, and thus the temporal automated control can be achieved.

The driving control device 5 makes higher-level control decisions than the steering control device 1 based on various information acquired by the external sensor 40 and the internal sensor 41. The driving control device 5 is configured to generate a control flag indicating a control instruction for the steering control device 1 in the automatic control. The control flag includes a steering flag Fs. The steering flag Fs is a flag for instructing, to the steering control device 1, a steering control to switch the steering angle θ of the steering tire 20 to an angle for the next start of the stopped vehicle 2.

The steering control device 1 is connected with the steering actuator 3, the sensor system 4, and the driving control device 5 through at least one of LAN (Local Area Network), a wire harness, an internal bus, or the like. The steering control device 1 includes at least one dedicated computer. The dedicated computer of the steering control device 1 may be an ECU dedicated to the steering for controlling the steering actuator 3. The dedicated computer of the steering control device 1 may be an ECU of the locator used for the advanced driver assistance or the automated driving control of the vehicle 2. The dedicated computer of the steering control device 1 may be an ECU of the navigation device configured to navigate the driving of the vehicle 2. The steering control device 1 may be the ECU shared with the driving control device 5.

The dedicated computer of the steering control device 1 has at least one memory 10 and at least one processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one of, for example, a CPU (Central Processing Unit), a GPU (Graphics Processing Unit), an RISC (Reduced Instruction Set Computer) CPU, and so on.

The processor 12 executes multiple instructions included in a steering control program stored in the memory 10. Accordingly, the steering control device 1 includes functional blocks for controlling the steering of the vehicle 2, as shown in FIG. 2. As described above, in the steering control device 1, the functional blocks are built by causing the processor 12 to execute multiple instructions of the steering control program stored in the memory 10 for controlling the steering of the vehicle 2. The functional blocks include a control switching unit 100, a trajectory following control unit 110, and an angle following control unit 120.

The control switching unit 100 is configured to switch between a stop control period Δs and a normal control period Δn. In the stop control period Δs, a stop control is performed in response to a stop of the vehicle 2. In the normal control period Δn, a normal control is performed. The control switching unit 100 is configured to monitor starting conditions for starting the stop control period Δs. As shown in FIG. 3, the starting conditions for the stop control period Δs include a speed condition Cs1 and a steering condition Cs2. The control switching unit 100 is configured to maintain the normal control period Δn when at least one of the speed condition Cs1 and the steering condition Cs2 is not satisfied. In contrast, the control switching unit 100 starts the stop control period Δs when both the speed condition Cs1 and the steering condition Cs2 are satisfied.

A requirement for satisfying the speed condition Cs1 is that the traveling speed V acquired by the traveling speed sensor 44 is within an acceptable speed range. The acceptable speed range may be at or below a threshold value that is an upper limit of the traveling speed V for the stop control. The acceptable speed range may be below a threshold value that is a lower limit of the traveling speed V for limiting the stop control.

A requirement for satisfying the steering condition Cs2 is that an angular velocity of the actual angle θr acquired by the steering angle sensor 42 is within an acceptable angular velocity range. The acceptable angular velocity range may be at or below a threshold value that is an upper limit of the angular velocity for the stop control. The acceptable angular velocity range may be below a threshold value that is a lower limit of the angular velocity for limiting the stop control.

The control switching unit 100 is configured to monitor release conditions for releasing the stop control period Δs after the stop control period Δs is started. As shown in FIG. 4, the release conditions for the stop control period Δs include a speed condition Cr1, a steering condition Cr2, and a trajectory condition Cr3. The control switching unit 100 is configured to maintain the stop control period Δs while all of the speed condition Cr1, the steering condition Cr2, and the trajectory condition Cr3 are not satisfied. In contrast, the control switching unit 0100 is configured to release the stop control period Δs when at least one of the speed condition Cr1, the steering condition Cr2, and the trajectory condition Cr3 is satisfied.

A requirement for satisfying the speed condition Cr1 is that the traveling speed V acquired by the traveling speed sensor 44 is within a release speed range. The release speed range may be at or above a threshold value that is a lower limit of the traveling speed V for releasing the stop control. The release speed range may be above a threshold value that is an upper limit of the traveling speed V for maintaining the stop control.

A requirement for satisfying the steering condition Cr2 is that the steering flag Fs is given from the driving control device 5. That is, the steering condition Cr2 is satisfied in response to the steering of the steering tire 20 while the stop control period Δs.

Figure 5:
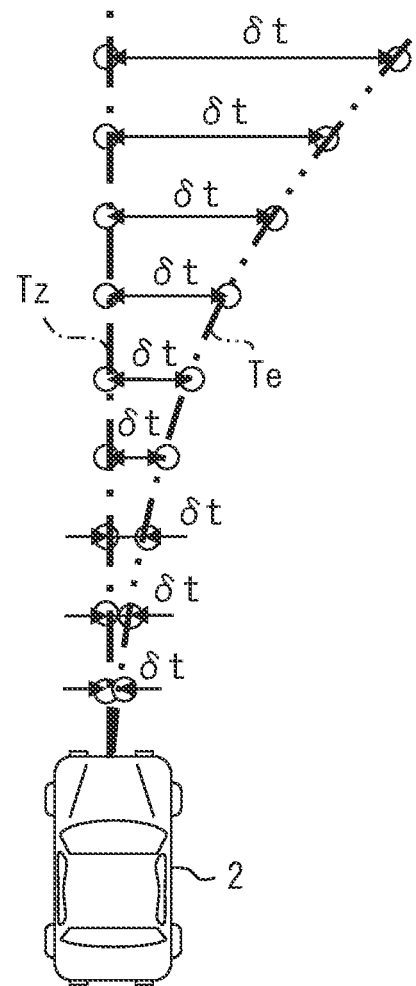
FIG. 5 is a schematic diagram for explaining the control switching unit according to the first embodiment.

A requirement for satisfying the trajectory condition Cr3 is that a trajectory deviation as shown in FIG. 5 is assumed during the stop control period Δs. The trajectory deviation is defined as a trajectory deviation δt between an estimated trajectory Te according to the actual angle θr acquired by the steering angle sensor 42 and a target trajectory Tz acquired by the trajectory following control unit 110. The estimated trajectory Te is calculated by estimating the traveling of the vehicle 2 using a turning radius represented by a proportion of a wheelbase and the actual angle θr. When an integral value (hereinafter, referred to as a trajectory deviation integral value) of the trajectory deviation δt between the estimated trajectory Te and the target trajectory Tz is within a release deviation range, it is determined that the trajectory deviation satisfying the trajectory condition Cr3 is assumed. The release deviation range may be at or above a threshold value that is a lower limit of the trajectory deviation integral value for releasing the stop control. The release deviation range may be above a threshold value that is an upper limit of the trajectory deviation integral value for maintaining the stop control.

The control switching unit 100 is configured to give an on-flag Fon of the stop control to the trajectory following control unit 110 and the angle following control unit 120 in a period from the start timing to the release timing of the stop control period Δs. In contrast, the control switching unit 100 is configured to give an off-flag Foff of the stop control to the trajectory following control unit 110 and the angle following control unit 120 in a period from the start timing to the release timing of the normal control period Δn.

The trajectory following control unit 110 shown in FIG. 2 is configured to control the trajectory which is to be followed by the vehicle 2. The trajectory following control unit 110 includes, as sub-functional units, a state quantity acquiring unit 111, a target trajectory acquiring unit 112, a target angle adjustment unit 113, and a forced control unit 114.

A state quantity acquiring unit 111 is configured to acquire the state quantity Z of the vehicle 2 by the estimation process based on the acquired information of the external sensor 40 and the internal sensor 41. The state quantity Z contains the position and the yaw angle of the vehicle 2. The state quantity Z may further contain at least one of the traveling speed V and the acceleration.

The target trajectory acquiring unit 112 is configured to acquire the target trajectory Tz as a trajectory of the vehicle 2 that defines changes of the state quantity Z. The target trajectory Tz is generated in accordance with the control instruction indicated by the control flag given by the driving control device 5.

Figure 6:
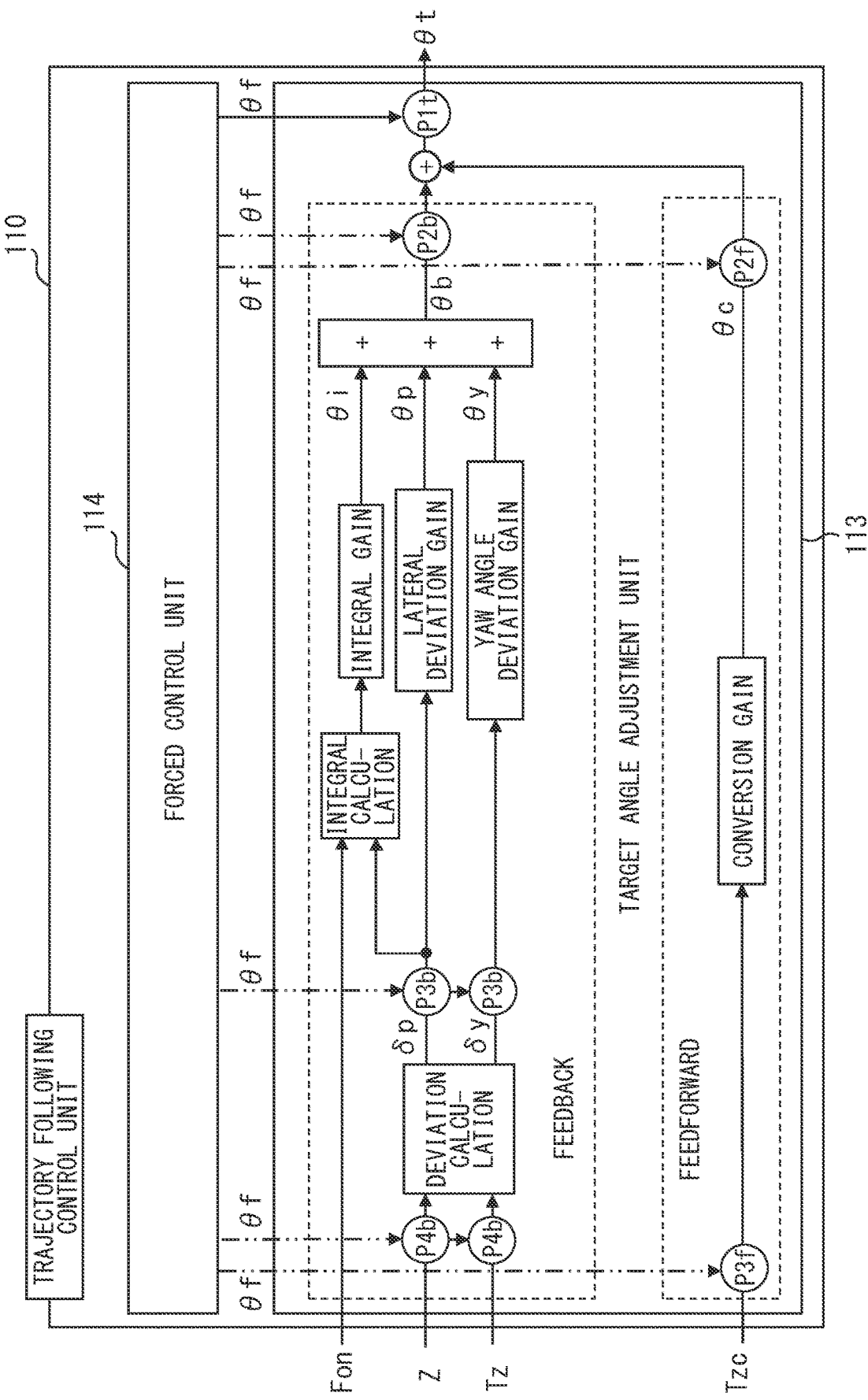
FIG. 6 is a block diagram for explaining a trajectory following control according to the first embodiment.

The target angle adjustment unit 113 is configured to execute a trajectory following control to cause the state quantity Z acquired by the state quantity acquiring unit 111 to follow the target trajectory Tz acquired by the target trajectory acquiring unit 112. As a result of the trajectory following control, the target angle adjustment unit 113 adjusts the target angle θt of the steering angle θ given to the angle following control unit 120 such that the state quantity Z approaches the value defined by the target trajectory Tz. The target angle adjustment unit 113 generates the target angle θt as shown in FIG. 6 by adding a feedforward angle θc acquired by a feedforward control to a feedback angle θb acquired by a feedback control. That is, the trajectory following control by the target angle adjustment unit 113 is realized by a combination of the feedback control and the feedforward control.

In the feedback control, the target angle adjustment unit 113 acquires a lateral deviation δp and a yaw angle deviation δy by a deviation calculation. The lateral deviation δp is a deviation between a position of the vehicle 2 in the lateral direction contained in the state quantity Z and a position defined by the target trajectory Tz. The yaw angle deviation δy is a deviation between a yaw angle of the vehicle 2 contained in the state quantity Z and an angle defined by the target trajectory Tz.

In the feedback control, the target angle adjustment unit 113 converts the integral value of the lateral deviation δp into an individual control angle θi based on an integral gain. the integral value of the lateral deviation δp is fixed to a fixed value during the stop control period Δs in which the on-flag Fon of the stop control is given from the control switching unit 100. In the feedback control, the target angle adjustment unit 113 converts the lateral deviation δp and the yaw angle deviation δy into individual control angles θp, θy based on the lateral deviation gain and the yaw angle deviation gain, respectively. In the feedback control, the target angle adjustment unit 113 generates the feedback angle θb by adding these converted individual control angles θi, θp, θy.

In the feedforward control, the target angle adjustment unit 113 converts a curvature Tzc of the target trajectory Tz into the feedforward angle θc based on the conversion gain. The target angle adjustment unit 113 determines the target angle θt by adding the converted feedforward angle θc to the feedback angle θb.

Figure 7:
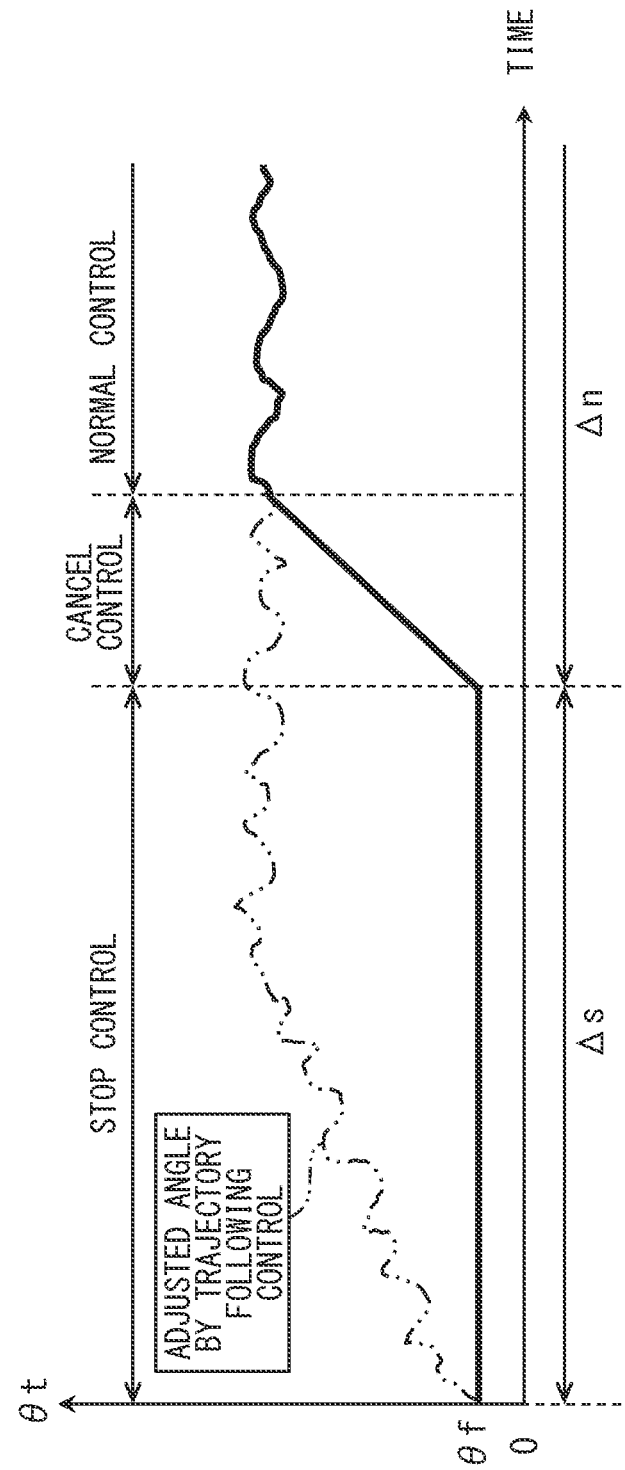
FIG. 7 is a graph for explaining the trajectory following control according to the first embodiment.

The forced control unit 114 shown in FIGS. 2, 6 forcibly sets a fixed angle θf shown in FIG. 7 as the target angle θt given from the target angle adjustment unit 113 to the angle following control unit 120 during the stop control period Δs in which the on-flag Fon of the stop control is given by the control switching unit 100. That is, the forced control unit 114 performs the stop control during the stop control period Δs. The forced control unit 114 of the first embodiment sets the fixed angle θf during the stop control period Δs from the start timing and the release timing to be the same angle as the target angle θt at the start timing. As a result, the target angle θt given to the angle following control unit 120 is continuously held to the fixed angle θf for the entire stop control period Δs, regardless of the trajectory following control by the target angle adjustment unit 113. In FIG. 7, only the positive side of the target angle θt is shown.

As shown in FIG. 6, the forced control unit 114 may be configured to keep, to the fixed angle θf, the target angle θt as the control variable at a control point P1t after the addition by the target angle adjustment unit 113. The forced control unit 114 may fix the target angle θt to the fixed angle θf by fixing a predetermined control variable in the feedback control and the feedforward control performed by the target angle adjustment unit 113.

One of the control points P2b, P3b, P4b is selected as the variable fixing point at which the control variable is fixed in the feedback control. When the control point P2b is selected as the variable fixing point, the feedback angle θb as the control variable is fixed. When the control point P3b is selected as the variable fixing point, the lateral deviation δp and the yaw angle deviation δy as the control variables are fixed. When the control point P4b is selected as the variable fixing point, the position and the yaw angle contained in the state quantity Z, and the values defining the position and the yaw angle in the target trajectory Tz are fixed.

In contrast, one of the control points P2f, P3f is selected as the variable fixing point at which the control variable is fixed in the feedforward control. When the control point P2f is selected as the variable fixing point, the feedforward angle θc as the control variable is fixed. When the control point P2f is selected as the variable fixing point, the curvature Tzc of the target trajectory Tz as the control variable is fixed.

While the normal control period Δn in which the off-flag Foff of the stop control is given from the control switching unit 100 to the forced control unit 114, the forced control unit 114 performs the normal control as shown in FIG. 7 after releasing the stop control that forces the target angle θt to be the fixed angle θf. As a result, the target angle θt adjusted by the trajectory following control by the target angle adjustment unit 113 is given to the angle following control unit 120 during the normal control period Δn.

The forced control unit 114 is configured to perform the release control when the on-flag Fon of the stop control given by the control switching unit 100 is changed to the off-flag Foff of the stop control, that is, when the stop control period Δs is released and changed to the normal control period Δn. In the release control, the forced control unit 114 gradually changes the target angle θt, which is given from the target angle adjustment unit 113 to the angle following control unit 120, from the fixed angle θf fixed in the stop control period Δs to the adjusted angle adjusted by the trajectory following control by the target angle adjustment unit 113 as shown in FIG. 7. The gradual change of the target angle θt is realized by changing the control variable at ones of the control points P1*t*, P2*b*, P3*b*, P4*b*, P2*f*, P3*f* corresponding to the stop control. After the gradual change is completed and thus the release control ends, the target angle θt is adjusted by the trajectory following control by the target angle adjustment unit 113.

Figure 8:
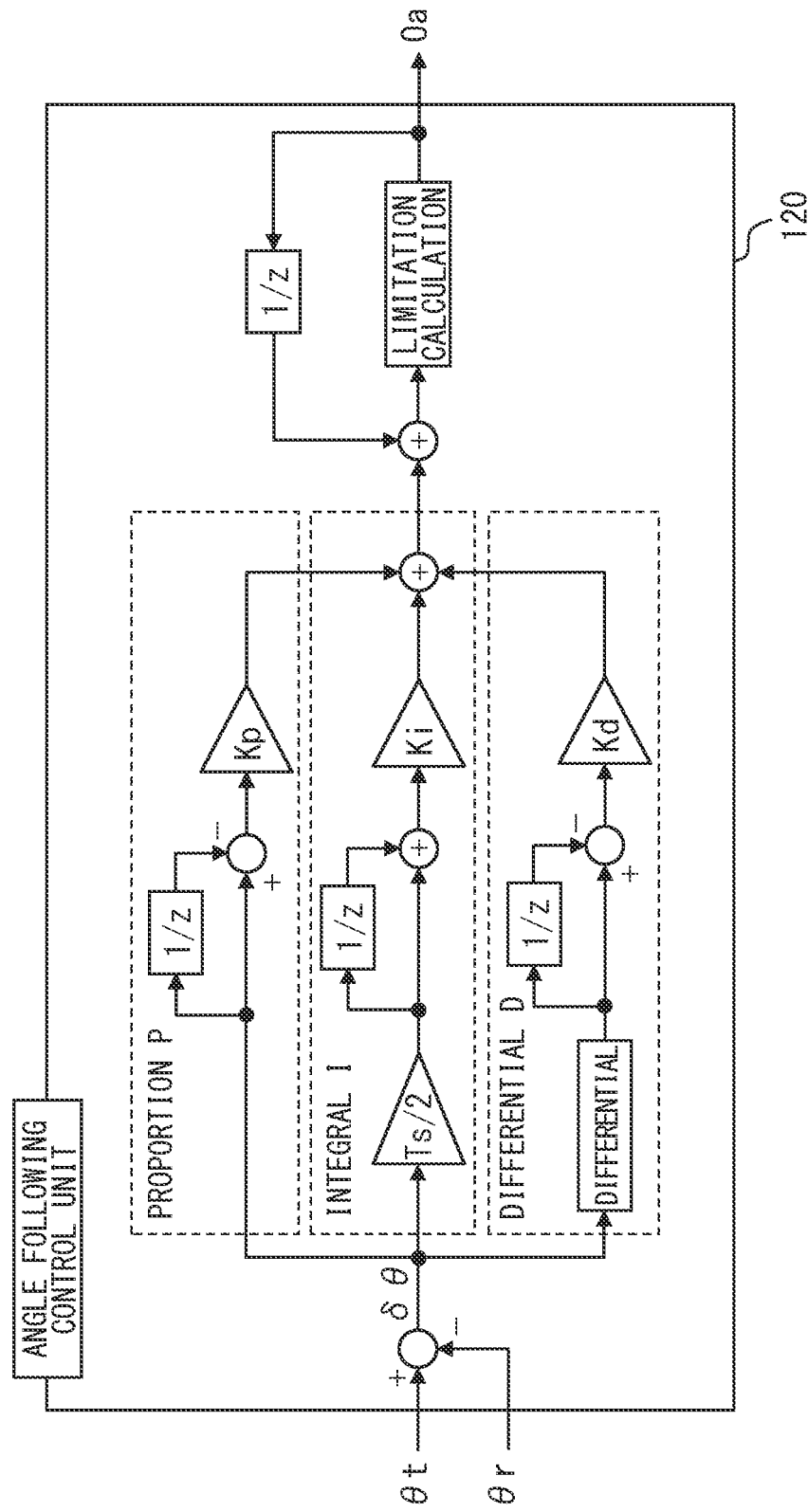
FIG. 8 is a block diagram for explaining an angle following control unit according to the first embodiment.

The angle following control unit 120 shown in FIG. 2 controls the steering angle θ to which the vehicle 2 follows. The angle following control unit 120 performs the angle following control to cause the actual angle θr acquired from the steering angle sensor 42 to follow the target angle θt from the target angle adjustment unit 113. Through the angle following control, the angle following control unit 120 adjusts the instruction value Oa, which is to be given to the steering actuator 3, such that the actual angle θr approaches the target angle θt. The angle following control unit 120 generates the instruction value Oa by PID control based on the angle deviation δθ between the target angle θt and the actual angle θr as shown in FIG. 8. That is, the angle following control by the angle following control unit 120 is realized by the PID control.

The angle following control unit 120 performs a limiting calculation to limit the output value Ao of the steering actuator 3 by holding the previous value of the instruction value Oa prior to giving the instruction value Oa by the PID control to the steering actuator 3. The limited value of the output value Ao is set to correspond to the rated output of the steering motor 30, for example.

The steering actuator 3 adjusts the output value Ao shown in FIGS. 1, 2 according to the instruction value Oa adjusted by the angle following control unit 120. As a result, the steering angle θ of the steering tire 20 is controlled to be the target angle θt, and thus the actual angle θr of the steering angle θ corresponds to the instruction value Oa given to the steering actuator 3.

The flow of the steering control method (hereinafter, referred to as a steering control flow) for the steering control device 1 to control the steering of the vehicle 2 jointly by the control switching unit 100, the trajectory following control unit 110, and the angle following control unit 120 is described below with reference to FIGS. 9, 10. Further, in this flow, "S" means steps of the steering control flow executed by instructions included in the steering control program.

Figure 9:
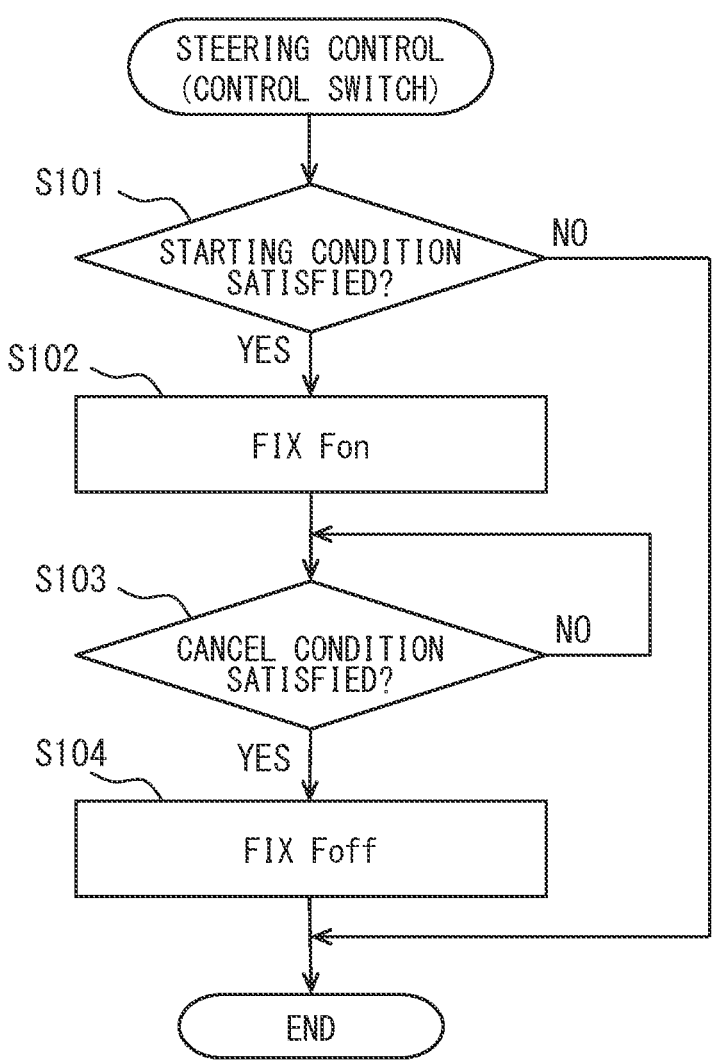
FIG. 9 is a flowchart illustrating a steering control method according to the first embodiment.

In the steering control flow, a control switching flow shown in FIG. 9 is repeatedly executed. In S101 of the control switching flow, the control switching unit 100 determines whether both of the speed condition Cs1 and the steering condition Cs2 are satisfied, as the starting condition of the stop control period Δs. When it is determined that at least one of the speed condition Cs1 and the steering condition Cs2 is not satisfied, the control switching flow ends. When it is determined that both of the speed condition Cs1 and the steering condition Cs2 are satisfied, the control switching flow proceeds to S102.

In S102, the control switching unit 100 fixes, to the on-flag Fon of the stop control, the control flag given to the trajectory following control unit 110 and the angle following control unit 120. In S103, the control switching unit 100 determines, as the release conditions of the stop control period Δs, whether at least one of the speed condition Cr1, the steering condition Cr2, and the trajectory condition Cr3 is satisfied. When it is determined that all of the speed condition Cr1, the steering condition Cr2, and the trajectory condition Cr3 are not satisfied, S103 is repeated. When it is determined that at least one of the speed condition Cr1, the steering condition Cr2, and the trajectory condition Cr3 is satisfied, the control switching flow proceeds to S104.

In S104, the control switching unit 100 fixes, to the off-flag Foff of the stop control, the control flag given to the trajectory following control unit 110 and the angle following control unit 120. As a result, the control switching flow ends.

Figure 10:
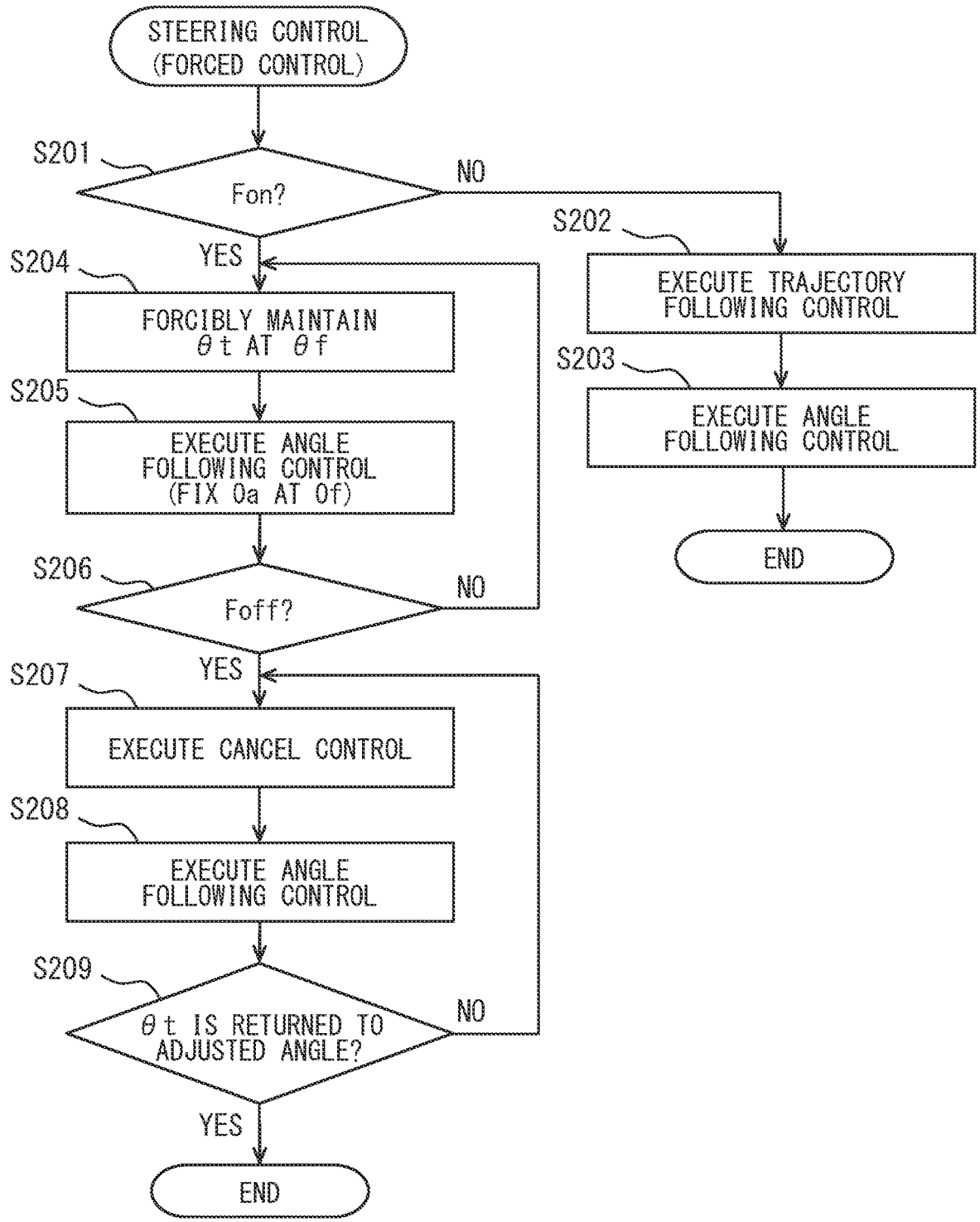
FIG. 10 is a flowchart illustrating the steering control method according to the first embodiment.

In the steering control flow, a forced control flow shown in FIG. 10 is repeated in parallel with the control switching flow. In S201 of the forced control, the forced control unit 114 determines whether the control flag given from the control switching unit 100 is the on-flag Fon of the stop control. When it is determined that the control flag is the off-flag Foff of the stop control, the forced control flow proceeds to S202.

In S202, the target angle adjustment unit 113 performs the trajectory following control to cause the state quantity Z of the vehicle 2 to follow the target trajectory Tz, and thus adjusts the target angle θt of the steering angle θ given to the angle following control unit 120. In S203, the angle following control unit 120 performs the angle following control to cause the actual angle θr of the steering angle θ to follow the target angle θt adjusted in S202, and thus adjusts the instruction value Oa given to the steering actuator 3 and corresponding to the actual angle θr. As a result, the forced control flow ends.

When it is determined that the control flag given from the control switching unit 100 is the on-flag Fon of the stop control, the forced control flow proceeds to S204. In S204, the forced control unit 114 forcibly keeps the target angle θt given from the target angle adjustment unit 113 to the angle following control unit 120 to be the fixed angle θf regardless of the trajectory following control by the target angle adjustment unit 113. In S205, the angle following control unit 120 performs the angle following control to cause the actual angle θr to follow the target angle θt forcibly kept in S204, and thus fixes the instruction value Oa given to the steering actuator 3. The instruction value Oa can be referred to as a fixed value Of.

In S206, the forced control unit 114 determines whether the control flag given from the control switching unit 100 is the off-flag Foff of the stop control. When it is determined that the control flag is the on-flag of the stop control, the flow returns to S204. Accordingly, while the negative determination is made in S206, that is, during the stop control period Δs, S204-S206 are repeatedly performed such that the target angle θt is kept at the fixed angle θf and the instruction value Oa is kept at the fixed value Of.

When the positive determination is made in S206, the forced control flow proceeds to S207. In S207, the forced control unit 114 performs the release control. The forced control unit 114 changes the target angle θt given to the angle following control unit 120 from the fixed angle θf at the transition timing to S207 (i.e. the releasing timing of the stop control period Δs) to the adjusted angle of the trajectory following control by the target angle adjustment unit 113. In S208, the angle following control unit 120 performs the angle following control to cause the actual angle θr to follow the target angle θt changed in S207, and thus changes the instruction value Oa given to the steering actuator 3.

In S209, the forced control unit 114 determines whether the target angle θt which is changing from the fixed angle θf has returned to an error range from the adjusted angle acquired by the trajectory following control by the target angle adjustment unit 113. When the negative determination is made, the flow returns to S207. While the negative determination is made in S209, S207-S209 are repeated to gradually change the target angle θt and the instruction value Oa. In contrast, the positive determination is made in S209, the forced control flow ends.

In the first embodiment described above, S201, S202, S204, S206, S207, S209 correspond to a trajectory following control process, and S203, S205, S208 correspond to an angle following control process.

Operation Effects

Hereinbelow, effects of the above first embodiment will be described.

In the first embodiment, the instruction value Oa given to the steering actuator 3 is adjusted by the angle following control that causes the actual angle θr of the steering angle θ to follow the target angle θt of the steering angle θ given to the steering tire 20 of the vehicle 2. The target angle θt used in the angle following control is adjusted by the trajectory following control that causes the state quantity Z containing the position of the vehicle 2 to follow the target trajectory Tz. However, during the stop control period Δs associated with the stop of the vehicle 2, the target angle θt is forced to the fixed angle θf. According to this, the actual angle θr following the fixed angle θf and corresponding to the instruction value Oa is given from the steering actuator 3 to the steering tire 20, and thus the change of the steering angle θ which is the actual angle θr can be limited. Therefore, it is possible to suppress the discomfort felt by the occupants due to the change of the steering angle θ in the stopped vehicle 2. The discomfort that can be suppressed is the discomfort felt by the occupant with respect to at least one of the following types of discomfort: the rolling of the steering tires 20, the unusual noise or vibration caused thereby, and the rotation of the steering wheel when the occupant is in the vehicle 2.

According to the first embodiment, the target angle θt is kept at the fixed angle θf during the stop control period Δs. According to this, the actual angle θr following the fixed angle θf and corresponding to the instruction value Oa is given from the steering actuator 3 to the steering tire 20, and thus the change of the steering angle θ which is the actual angle θr can be limited during the stop control period Δs. Therefore, it is possible to continuously suppress the discomfort felt by the occupants due to the change of the steering angle θ in the stopped vehicle 2.

According to the first embodiment, the stop control period Δs is released in response to the steering of the steering tire 20 in the stop control period Δs. According to this, the adjustment of the target angle θt by the trajectory following control can be permitted when the steering angle θ, which is the actual angle θr corresponding to the instruction value Oa, is expected to change due to the steering. Therefore, it is possible to suppress not only the discomfort caused by the change of the steering angle θ in the stop vehicle 2, but also the discomfort caused by the limitation of the change.

In the first embodiment, when the deviation between the estimated trajectory Te based on the actual angle θr and the target trajectory Tz is assumed in the stop control period Δs, the stop control period Δs is released. According to this, the adjustment of the target angle θt by the trajectory following control can be permitted when the steering angle θ, which is the actual angle θr corresponding to the instruction value Oa, is expected to change due to the trajectory deviation. Therefore, it is possible to suppress not only the discomfort caused by the change of the steering angle θ in the stop vehicle 2, but also the discomfort caused by the limitation of the change.

According to the first embodiment, after the release of the stop control period Δs, the target angle θt is gradually changed from the fixed angle θf to the angle adjusted by the trajectory following control. According to this, when the steering angle θ returns from the fixed angle θf of the stop control period Δs to the adjusted angle of the normal adjustment by the trajectory following control, a sudden change in the steering angle θ can be avoided. Therefore, it is possible to suppress not only the discomfort caused by the change of the steering angle θ in the stop vehicle 2, but also the discomfort caused by the release of the limitation of the change.

Second Embodiment

Figure 11:
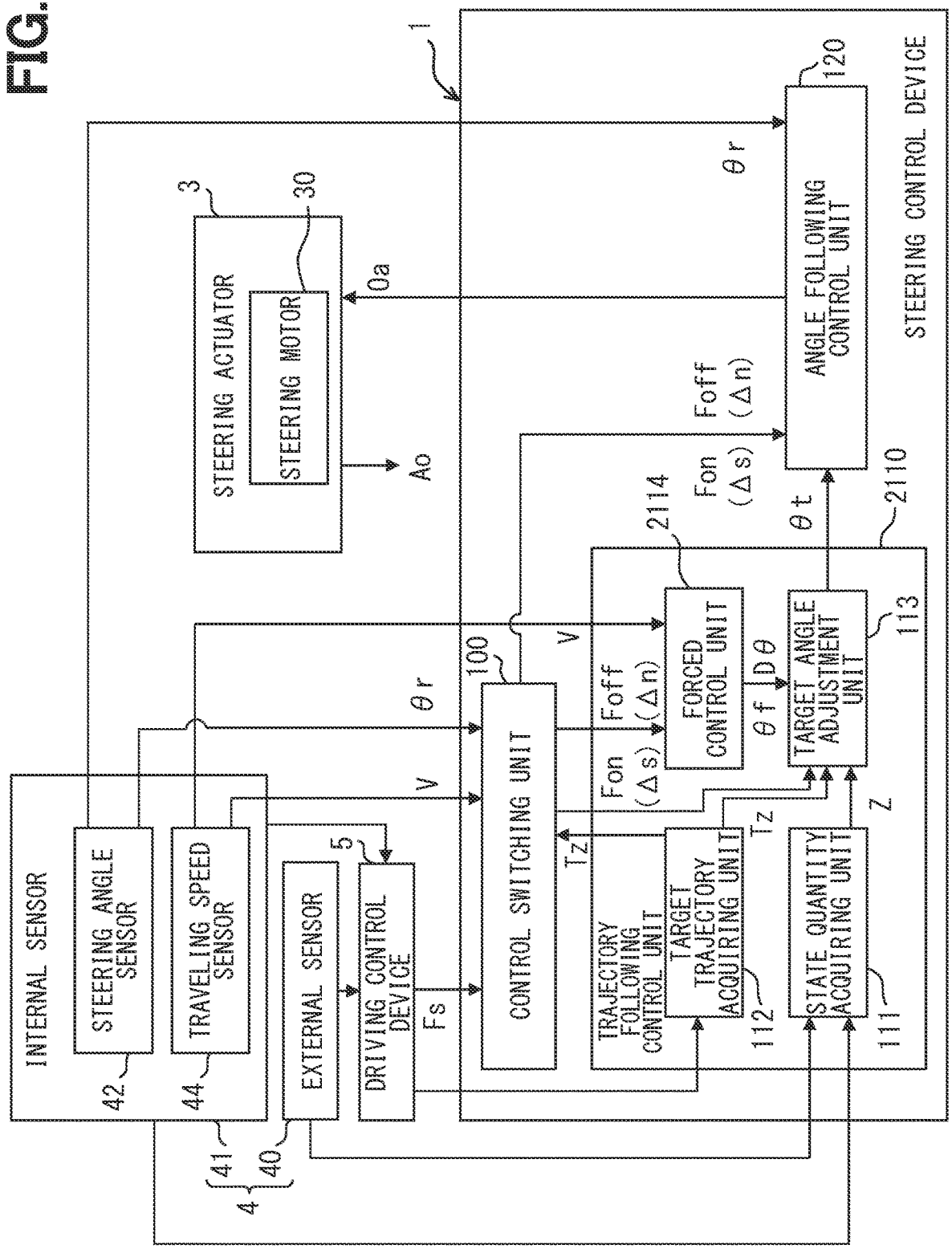
FIG. 11 is a block diagram showing a detail configuration of a steering control device according to a second embodiment.

As illustrated in FIGS. 11 to 15, a second embodiment is a modification of the first embodiment. A forced control unit 2114 of a trajectory following control unit 2110 of the second embodiment shown in FIG. 11 is different from the first embodiment in the stop control in the stop control period Δs.

Figure 12:
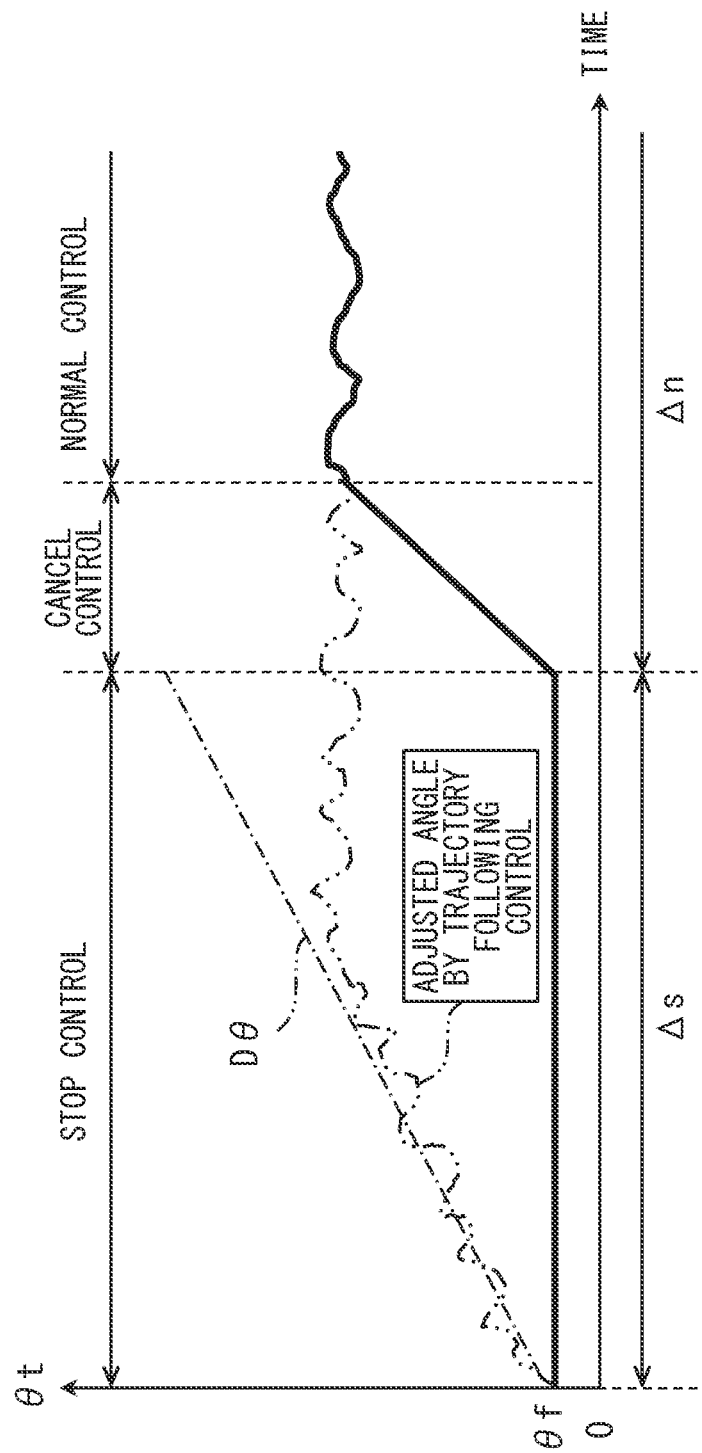
FIG. 12 is a graph for explaining a trajectory following control according to the second embodiment.
Figure 13:
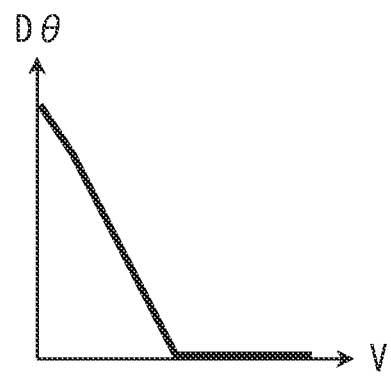
FIG. 13 is a graph for explaining the trajectory following control according to the second embodiment.

In the stop control, the forced control unit 2114 defines a dead zone Dθ in the stop control period Δs in which the on-flag Fon of the stop control is given from the control switching unit 100, as shown in FIG. 12. Therefore, the forced control unit 2114 sets the dead zone Dθ in the stop control period Δs to both positive and negative sides as the range of angles for the fixed angle θf among the target angle θt adjusted by the trajectory following control of the target angle adjustment unit 113. As shown in FIGS. 12, 13, the forced control unit 2114 of the second embodiment sets wider dead zone Dθ as the traveling speed V acquired by the traveling speed sensor 44 decreases in the stop control period Δs. In FIGS. 12, 13, only the positive side of the target angle θt is shown.

When the adjusted angle of the trajectory following control by the target angle adjustment unit 113 is outside the dead zone Dθ due to high traveling speed V in the stop control, the forced control unit 2114 adjusts the target angle θt given to the angle following control unit 120 to be the difference between the adjusted angle and the dead zone Dθ. The forced control unit 2114 provides the width of the dead zone Dθ on the same side for the positive and negative adjustment angle by the trajectory following control for the difference calculation. When the adjusted angle of the trajectory following control by the target angle adjustment unit 113 is within the dead zone Dθ due to low traveling speed V in the stop control, the forced control unit 2114 converts the target angle θt given to the angle following control unit 120 to be the fixed angle θf. That is, the forced control unit 2114 forcibly sets the target angle θt in the dead zone Dθ to be the fixed angle θf. By switching between these readjustment and forcing processes, the target angle θt given to the angle following control unit 120 is restrained from changing abruptly inside and outside the dead zone Dθ.

Figure 14:
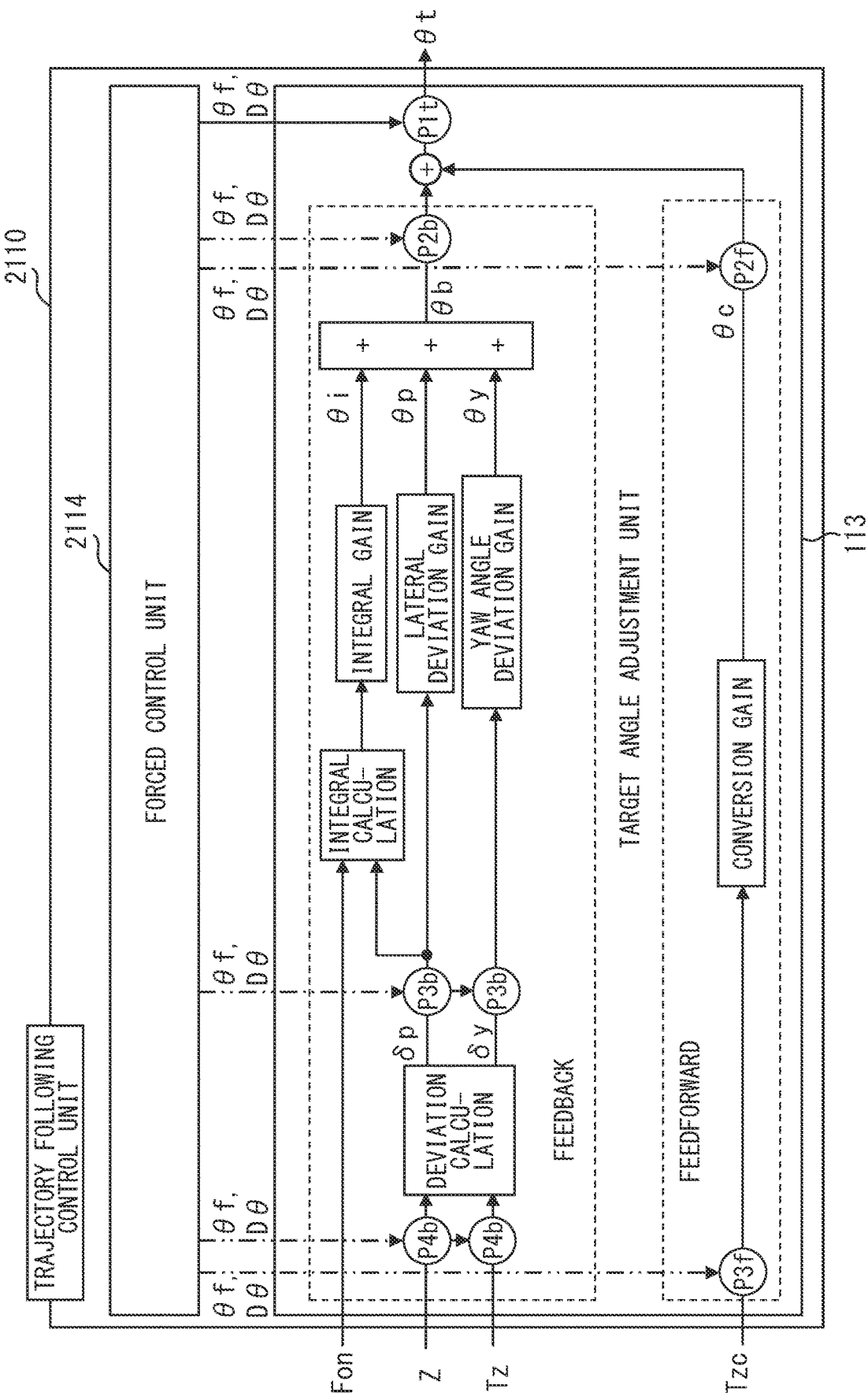
FIG. 14 is a block diagram for explaining the trajectory following control according to the second embodiment.

As shown in FIG. 14, the forced control unit 2114 may be configured to convert, into the fixed angle θf, the target angle θt in the dead zone Dθ as the control variable at a control point P1*t* after the addition by the target angle adjustment unit 113. The forced control unit 2114 may convert the target angle θt in the dead zone Dθ to the fixed angle θf by fixing, in a predetermined range corresponding to the dead zone Dθ, a predetermined control variable in the feedback control and the feedforward control performed by the target angle adjustment unit 113. One of the control points P2b, P3b, P4b is selected as the variable fixing point in the feedback control as in the first embodiment. One of the control points P2f, P3f is selected as the variable fixing point in the feedforward control as in the first embodiment.

During the normal control period Δn in which the off-flag of the stop control is given from the control switching unit 100, the forced control unit 2114 performs the normal control after performing the release control as in the first embodiment.

Figure 15:
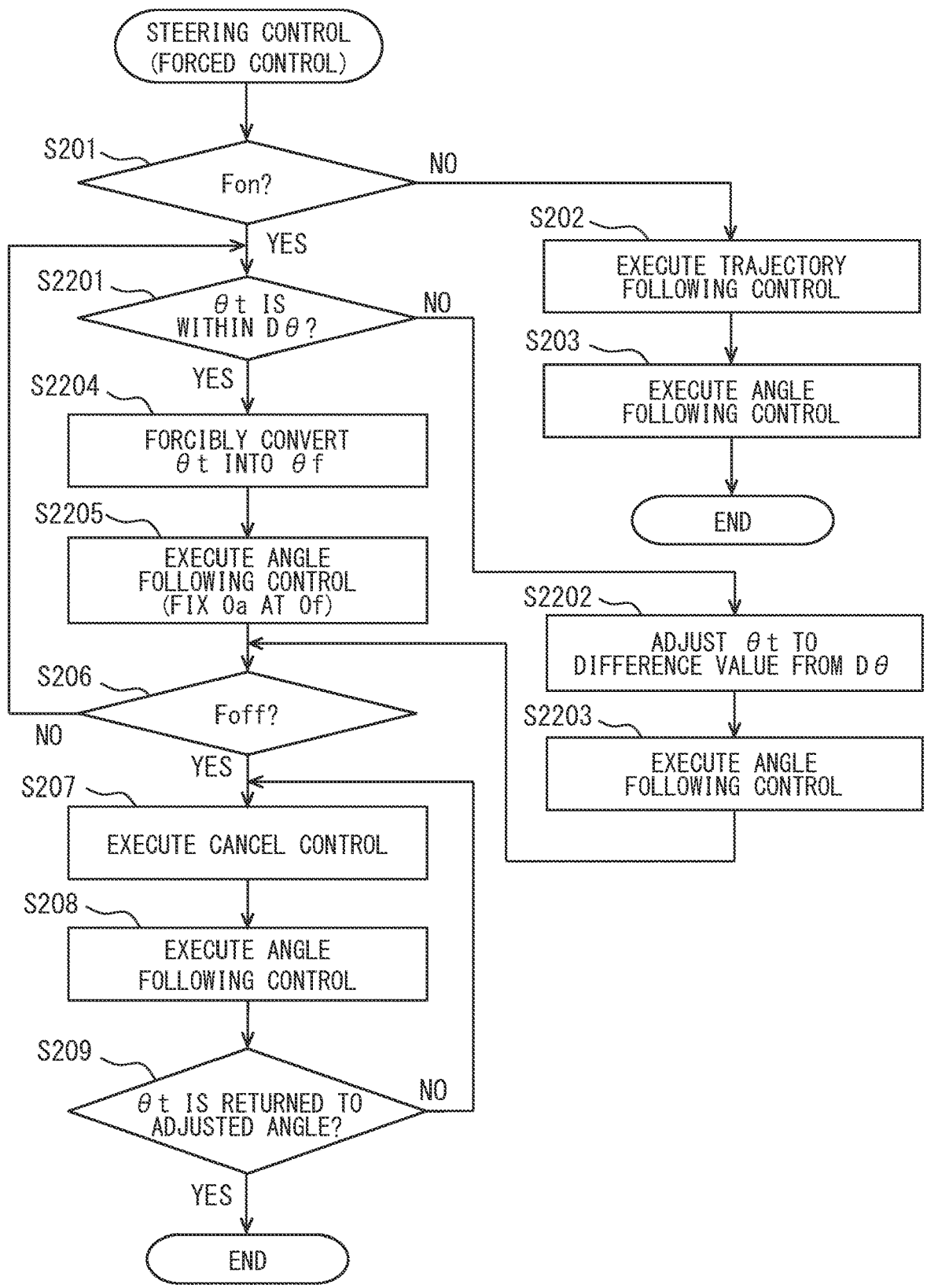
FIG. 15 is a flowchart illustrating a steering control method according to the second embodiment.

The control switching flow in the steering control flow of the second embodiment is the same as the first embodiment. In contrast, the forced control flow in the steering control flow of the second embodiment is different from the first embodiment as shown in FIG. 15.

S201-S203 of the forced control flow are the same as the first embodiment. In S2201 to which the flow proceeds from the S201 in response to the positive determination, the forced control unit 2114 determines whether the target angle θt of the trajectory following control by the target angle adjustment unit 113 is within the dead zone Dθ according to the traveling speed V.

When the negative determination is made in S2201, the forced control flow proceeds to S2202. In S2202, the forced control unit 2114 readjusts the target angle θt, which was adjusted by the trajectory following control of the target angle adjustment unit 113 to be a value outside the dead zone Dθ, to the difference value from the dead zone Dθ. In S2203, the angle following control unit 120 performs the angle following control to cause the actual angle θr to follow the target angle θt readjusted in S2202, and thus adjusts the instruction value Oa given to the steering actuator 3.

When the positive determination is made in S2201, the forced control flow proceeds to S2204. In S2204, the forced control unit 2114 forcibly converts the target angle θt, which was adjusted by the trajectory following control of the target angle adjustment unit 113 to be within the dead zone Dθ, into the fixed angle θf given to the angle following control unit 120. In S2205, the angle following control unit 120 performs the angle following control to cause the actual angle θr to follow the target angle θt forcibly converted in S204, and thus fixes the instruction value Oa given to the steering actuator 3. The instruction value Oa can be referred to as a fixed value Of.

Subsequent to one of S2203 and S2205, the forced control flow proceeds to S206. When the negative determination is made, the flow returns to S2201. When the positive determination is made, S207-S209 are performed as in the first embodiment.

In the first embodiment described above, S201, S202, S2201, S2202, S2204, S206, S207, S209 correspond to a trajectory following control process, and S203, S2203, S2205, S208 correspond to an angle following control process.

Operation Effects

The description below explains the operation and effect of the above-described second embodiment mainly regarding differences from the first embodiment.

According to the second embodiment, in the dead zone Dθ set in the stop control period Δs, the target angle θt is converted into the fixed angle θf. According to this, in the dead zone Dθ, the actual angle θr following the fixed angle θf and corresponding to the instruction value Oa is given from the steering actuator 3 to the steering tire 20, and thus the change of the steering angle θ which is the actual angle θr can be limited. Therefore, it is possible to suppress, using the dead zone Dθ, the discomfort felt by the occupants due to the change of the steering angle θ in the stopped vehicle 2.

According to the second embodiment, in the dead zone Dθ which is set to be wider as the traveling speed V of the vehicle 2 decreases in the stop control period Δs, the target angle θt is converted into the fixed angle θf. According to this, the change of the steering angle θ, which is the actual angle θr following the target angle θt which is likely to be forced to the fixed angle θf as the traveling speed V decreases due to the stop of the vehicle 2, is likely to be suppressed as the traveling speed V decreases. Therefore, it is possible to suppress, using the dead zone Dθ, the discomfort felt by the occupants due to the change of the steering angle θ in the stopped vehicle 2.

Third Embodiment

A third embodiment shown in FIGS. 16-19 is a modification of the first embodiment. A trajectory following control unit 3110 of the third embodiment shown in FIG. 16 does not have the forced control unit 114. Instead, an angle following control unit 3120 of the third embodiment has an instruction value adjustment unit 3121 and a forced control unit 3122 as sub-functional units.

The instruction value adjustment unit 3121 has substantially the same function as the angle following control unit 120 of the first embodiment. That is, the instruction value adjustment unit 3121 adjusts the instruction value Oa, which is given to the steering actuator 3 and corresponds to the actual angle θr, by the angle following control that causes the actual angle θr to follow the target angle θt acquired by the target angle adjustment unit 113.

Figure 16:
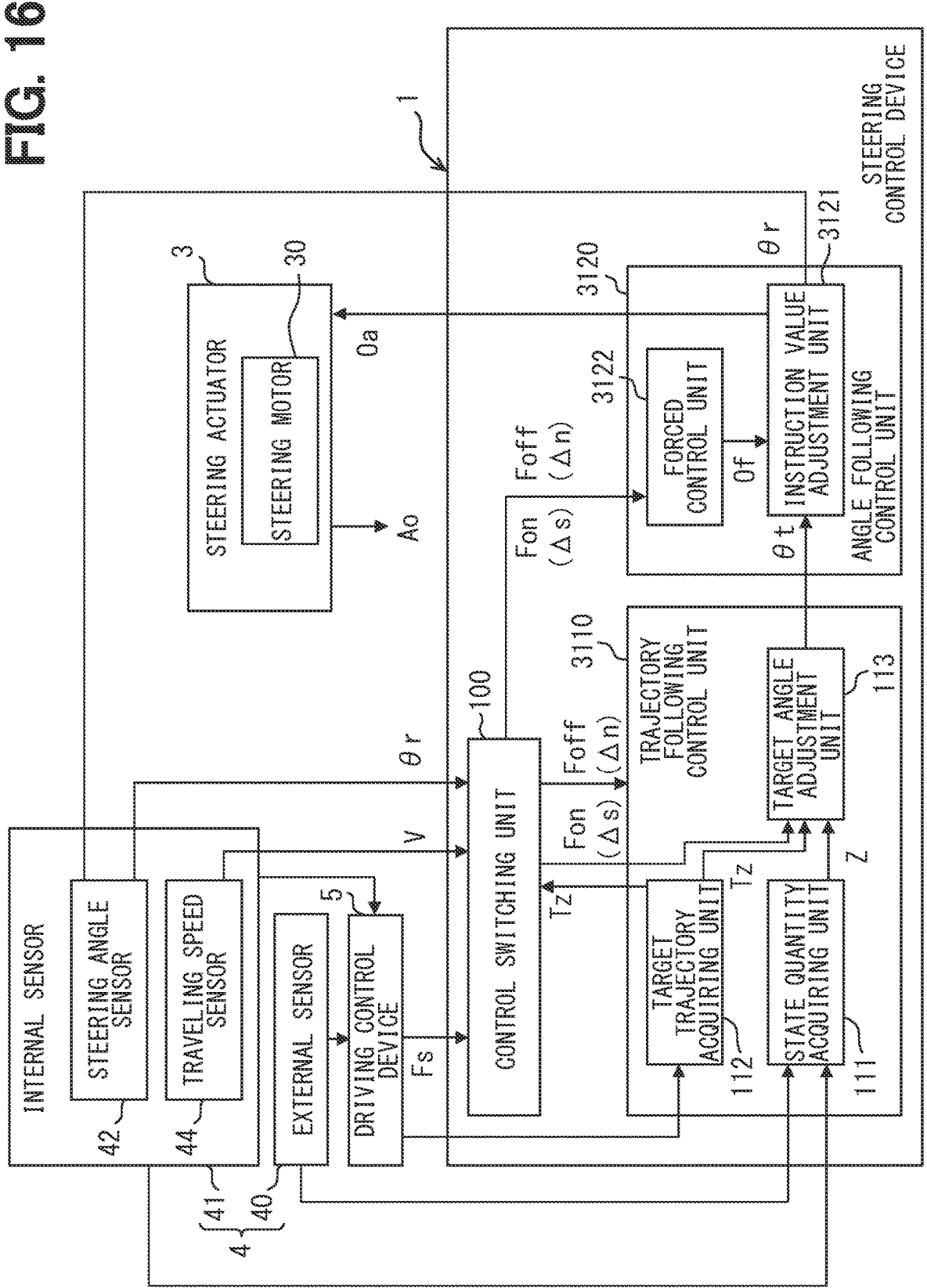
FIG. 16 is a block diagram showing a detail configuration of a steering control device according to a third embodiment.
Figure 17:
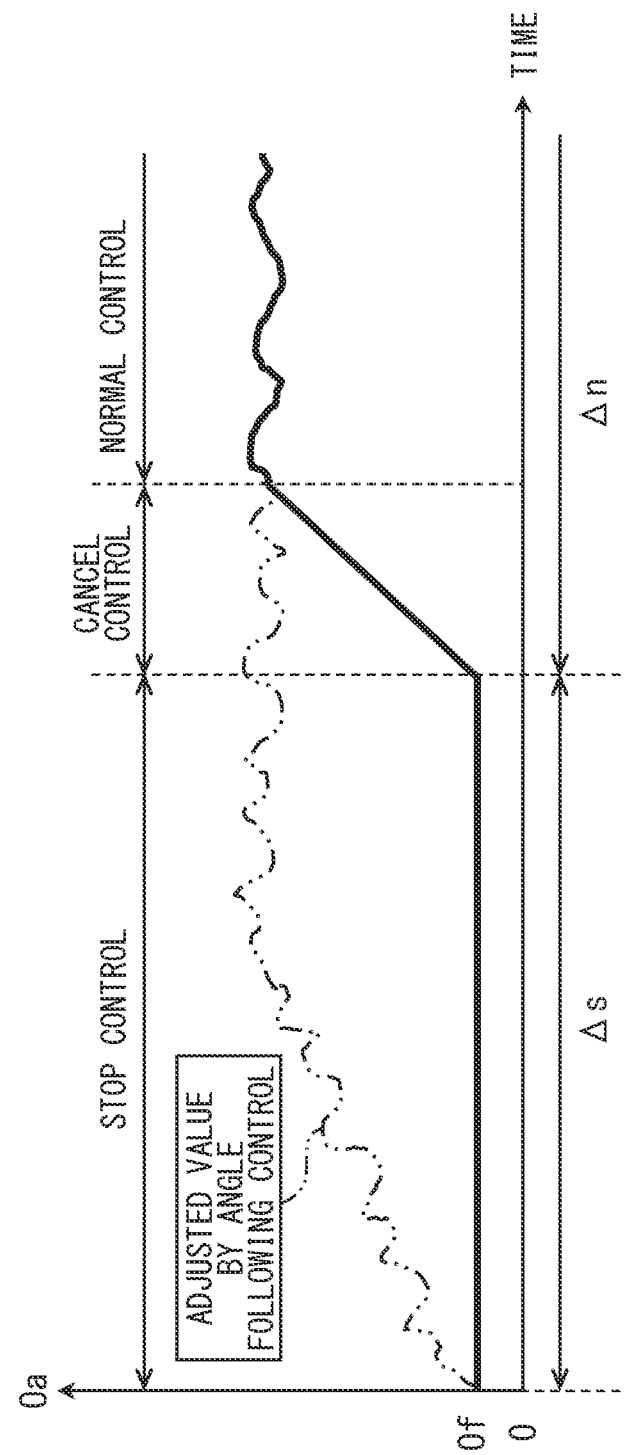
FIG. 17 is a graph for explaining an angle following control unit according to the third embodiment.
Figure 18:
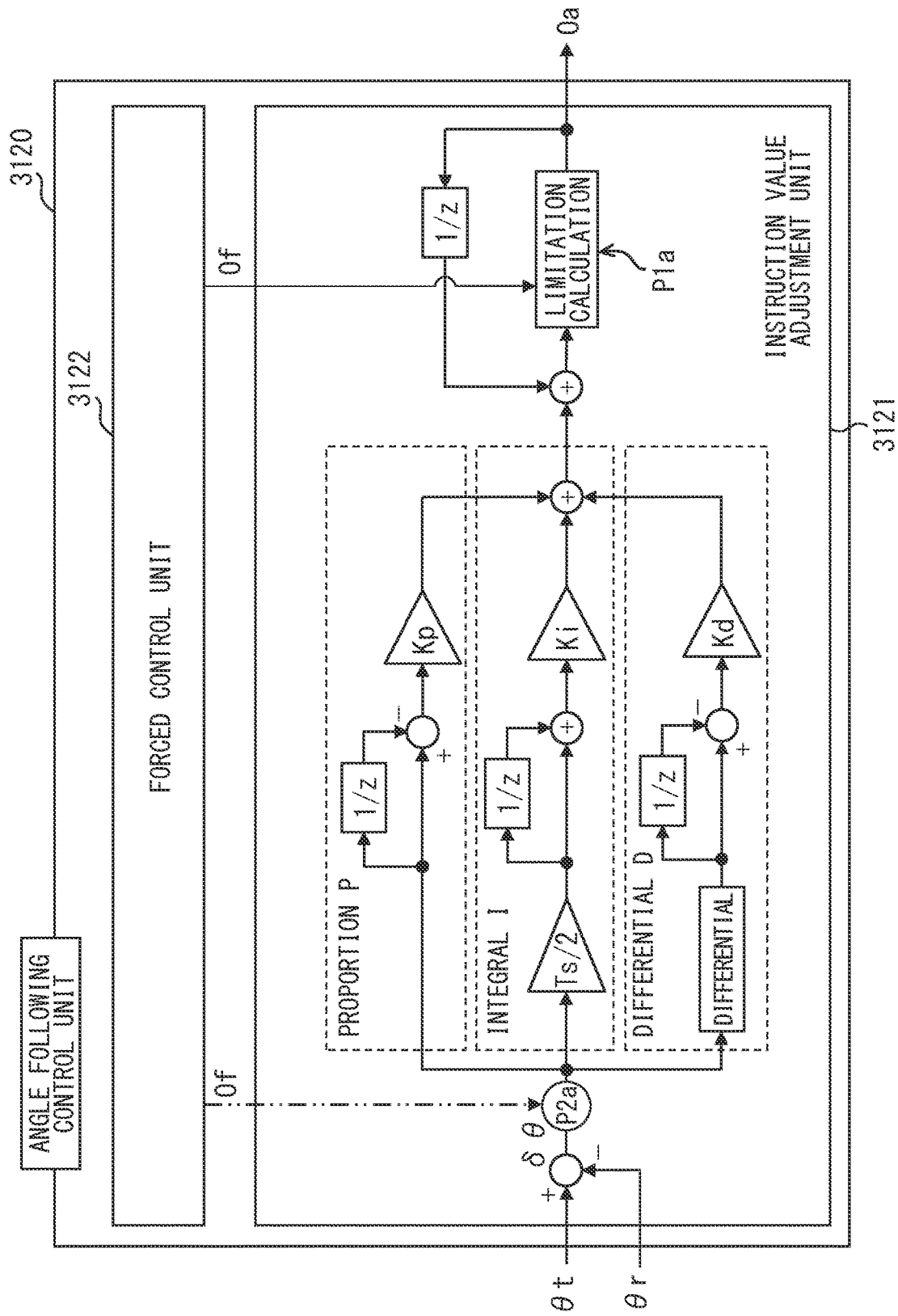
FIG. 18 is a block diagram for explaining the angle following control unit according to the third embodiment.

The forced control unit 3114 shown in FIGS. 16, 18 forcibly sets a fixed value Of shown in FIG. 17 as the instruction value Oa given from the instruction value adjustment unit 3121 to the steering actuator 3 during the stop control period Δs in which the on-flag Fon of the stop control is given by the control switching unit 100. That is, the forced control unit 3114 performs the stop control during the stop control period Δs. The forced control unit 3114 of the third embodiment sets the fixed value Of during the stop control period Δs from the start timing and the release timing to be the same value as the instruction value Oa at the start timing. As a result, the instruction value Oa given to the steering actuator 3 is continuously held to the fixed value Of for the entire stop control period Δs, regardless of the angle following control by the instruction value adjustment unit 3121. In FIG. 17, only the positive side of the instruction value Oa is shown.

As shown in FIG. 18, the forced control unit 3122 may keep the instruction value Oa at the fixed value Of by fixing a predetermined control variable in the PID control performed by the instruction value adjustment unit 3121. The control point P1a or P2a is selected as the variable fixing point in the PID control. When the control point P1a is selected as the variable fixing point, the instruction value Oa is fixed according to the limited value of the output value Ao which is the control variable calculated by the limitation calculation. When the control point P2a is selected as the variable fixing point, the angle deviation δθ between the target angle θt and the actual angle θr is fixed.

While the normal control period Δn in which the off-flag Foff of the stop control is given from the control switching unit 100 to the forced control unit 3122, the forced control unit 3122 performs the normal control as shown in FIG. 17 after releasing the stop control that forces the instruction value Oa to be the fixed value Of. Accordingly, during the normal control period Δn, the instruction value Oa adjusted by the angle following control by the instruction value adjustment unit 3121 is given to the steering actuator 3.

The forced control unit 3114 is configured to perform the release control when the on-flag Fon of the stop control given by the control switching unit 100 is changed to the off-flag Foff of the stop control, that is, when the stop control period Δs is released and changed to the normal control period Δn. In the release control, the forced control unit 3122 gradually changes the instruction value Oa, which is given from the instruction value adjustment unit 3121 to the steering actuator 3, from the fixed value Of fixed in the stop control period Δs to the adjusted value adjusted by the angle following control by the instruction value adjustment unit 3121 as shown in FIG. 17. The gradual change of the instruction value Oa is realized by changing the control variable at ones of the control points P1a, P2a corresponding to the stop control. After the gradual change is completed and thus the release control ends, the instruction value Oa is adjusted by the trajectory following control by instruction value adjustment unit 3121.

Figure 19:
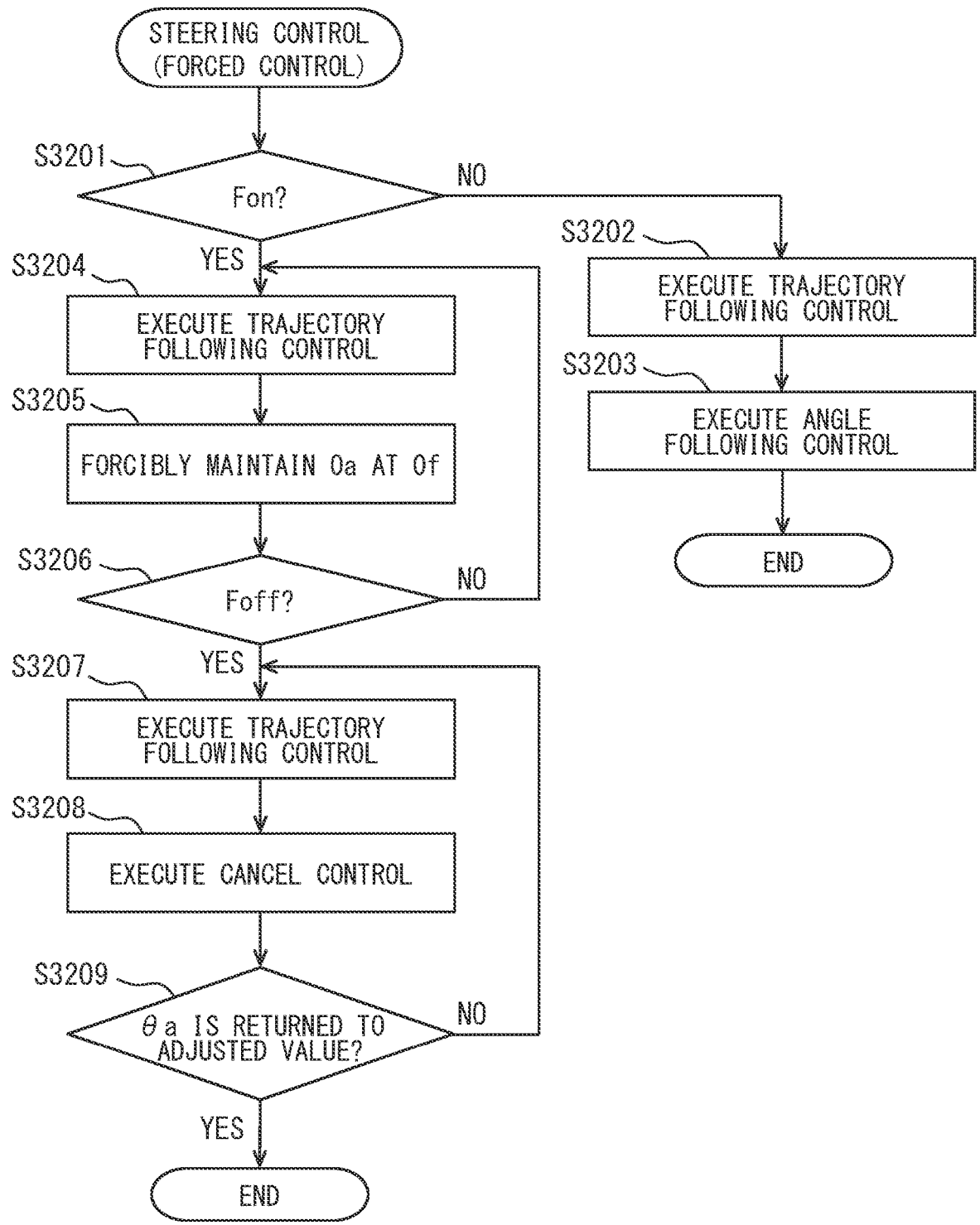
FIG. 19 is a flowchart illustrating a steering control method according to the third embodiment.

The control switching flow in the steering control flow of the third embodiment is the same as the first embodiment. In contrast, the forced control flow in the steering control flow of the third embodiment is different from the first embodiment as shown in FIG. 19.

Specifically, in S3201 of the forced control, the forced control unit 3122 determines whether the control flag given from the control switching unit 100 is the on-flag Fon of the stop control. When it is determined that the control flag is the off-flag Foff of the stop control, the forced control flow proceeds to S3202.

In S3202, the target angle adjustment unit 113 performs the trajectory following control to cause the state quantity Z of the vehicle 2 to follow the target trajectory Tz, and thus adjusts the target angle θt of the steering angle θ given to the angle following control unit 3120. In S3203, the instruction value adjustment unit 3121 performs the angle following control to cause the actual angle θr of the steering angle θ to follow the target angle θt adjusted in S3202, and thus adjusts the instruction value Oa given to the steering actuator 3 and corresponding to the actual angle θr. As a result, the forced control flow ends.

When the positive determination is made in S3201, the forced control flow proceeds to S3204. In S3204, the target angle adjustment unit 113 performs the trajectory following control to cause the state quantity Z of the vehicle 2 to follow the target trajectory Tz, and thus adjusts the target angle θt given to the angle following control unit 3120. However, in S3205, the forced control unit 3122 forcibly keeps the instruction value Oa given from the instruction value adjustment unit 3121 to the steering actuator 3 at the fixed value Of, regardless of the angle following control according to the target angle θt adjusted in S3201 by the instruction value adjustment unit 3121.

In S3206, the forced control unit 3122 determines whether the control flag given from the control switching unit 100 is the off-flag Foff of the stop control. When it is determined that the control flag is the on-flag of the stop control, the flow returns to S3204. Accordingly, while the negative determination is made in S3206, that is, during the stop control period Δs, S3204-S3206 are repeatedly performed to keep the instruction value Oa at the fixed value Of.

When the positive determination is made in S3206, the forced control flow proceeds to S3207. In S3207, the target angle adjustment unit 113 performs the trajectory following control to cause the state quantity Z to follow the target trajectory Tz, and thus adjusts the target angle θt of the steering angle θ given to the angle following control unit 3120. However, in S3208, the forced control unit 3122 performs the release control regardless of the target angle θt adjusted in S3201. The forced control unit 3122 changes the instruction value Oa given to the steering actuator 3 from the fixed value Of at the transition timing to S3208 (i.e. the releasing timing of the stop control period Δs) to the adjusted value of the angle following control value according to the target angle θt adjusted in S3201 by the instruction value adjustment unit 3121.

In S3209, the forced control unit 3122 determines whether the instruction value Oa which is changing from the fixed value Of has returned to an error range from the adjusted value acquired by the angle following control by the instruction value adjustment unit 3121. When the negative determination is made, the flow returns to S3207. While the negative determination is made in S3209, S3207-S3209 are repeated to gradually change the instruction value Oa. In contrast, the positive determination is made in S3209, the forced control flow ends.

In the third embodiment described above, S3202, S3204, S3207 correspond to a trajectory following control process, and S3201, S3203, S3205, S3206, S3208, S3209 correspond to an angle following control process.

Operation Effects

Hereinafter, effects of the above third embodiment will be described.

In the third embodiment, the target angle θt of the steering angle θ given to the steering tire 20 of the vehicle 2 is adjusted by the trajectory following control that causes the state quantity Z containing the position of the vehicle 2 to follow the target trajectory Tz. The instruction value Oa given to the steering actuator 3 is adjusted by the angle following control that causes the actual angle θr of the steering angle θ to follow the target angle θt adjusted by the trajectory following control. However, during the stop control period Δs associated with the stop of the vehicle 2, the instruction value Oa is forced to the fixed value Of. According to this, the actual angle θr corresponding to the fixed value Of is given from the steering actuator 3 to the steering tire 20, and thus the change of the steering angle θ which is the actual angle θr can be limited. Therefore, it is possible to suppress the discomfort felt by the occupants due to the change of the steering angle θ in the stopped vehicle 2. The sense of discomfort that can be suppressed here is the same as the sense of discomfort described in the operation and effect of the first embodiment.

According to the third embodiment, the instruction value Oa is kept at the fixed value Of during the stop control period Δs. According to this, the actual angle θr corresponding to the fixed value Of is given from the steering actuator 3 to the steering tire 20, and thus the change of the steering angle θ which is the actual angle θr can be limited during the stop control period Δs. Therefore, it is possible to continuously suppress the discomfort felt by the occupants due to the change of the steering angle θ in the stopped vehicle 2.

In the third embodiment, the stop control period Δs is released in response to the steering of the vehicle during the stop control period Δs by the control switching flow as in the first embodiment. According to this, the adjustment of the instruction value Oa by the angle following control can be permitted when the steering angle θ, which is the actual angle θr corresponding to the instruction value Oa, is expected to change due to the steering. Therefore, it is possible to suppress not only the discomfort caused by the change of the steering angle θ in the stop vehicle 2, but also the discomfort caused by the limitation of the change.

In the third embodiment, when the deviation between the estimated trajectory Te based on the actual angle θr and the target trajectory Tz is assumed in the stop control period Δs, the stop control period Δs is released by performing the control switching flow as in the first embodiment. According to this, the adjustment of the instruction value Oa by the angle following control can be permitted when the steering angle θ, which is the actual angle θr corresponding to the instruction value Oa, is expected to change due to the trajectory deviation. Therefore, it is possible to suppress not only the discomfort caused by the change of the steering angle θ in the stop vehicle 2, but also the discomfort caused by the limitation of the change.

According to the third embodiment, after the release of the stop control period Δs, the instruction value Oa is gradually changed from the fixed value Of to the value adjusted by the angle following control. According to this, when the instruction value Oa returns from the fixed value Of of the stop control period Δs to the adjusted value of the normal adjustment by the angle following control, a sudden change in the instruction value Oa can be avoided. Therefore, it is possible to suppress not only the discomfort caused by the change of the steering angle θ in the stop vehicle 2, but also the discomfort caused by the release of the limitation of the change.

Fourth Embodiment

Figure 20:
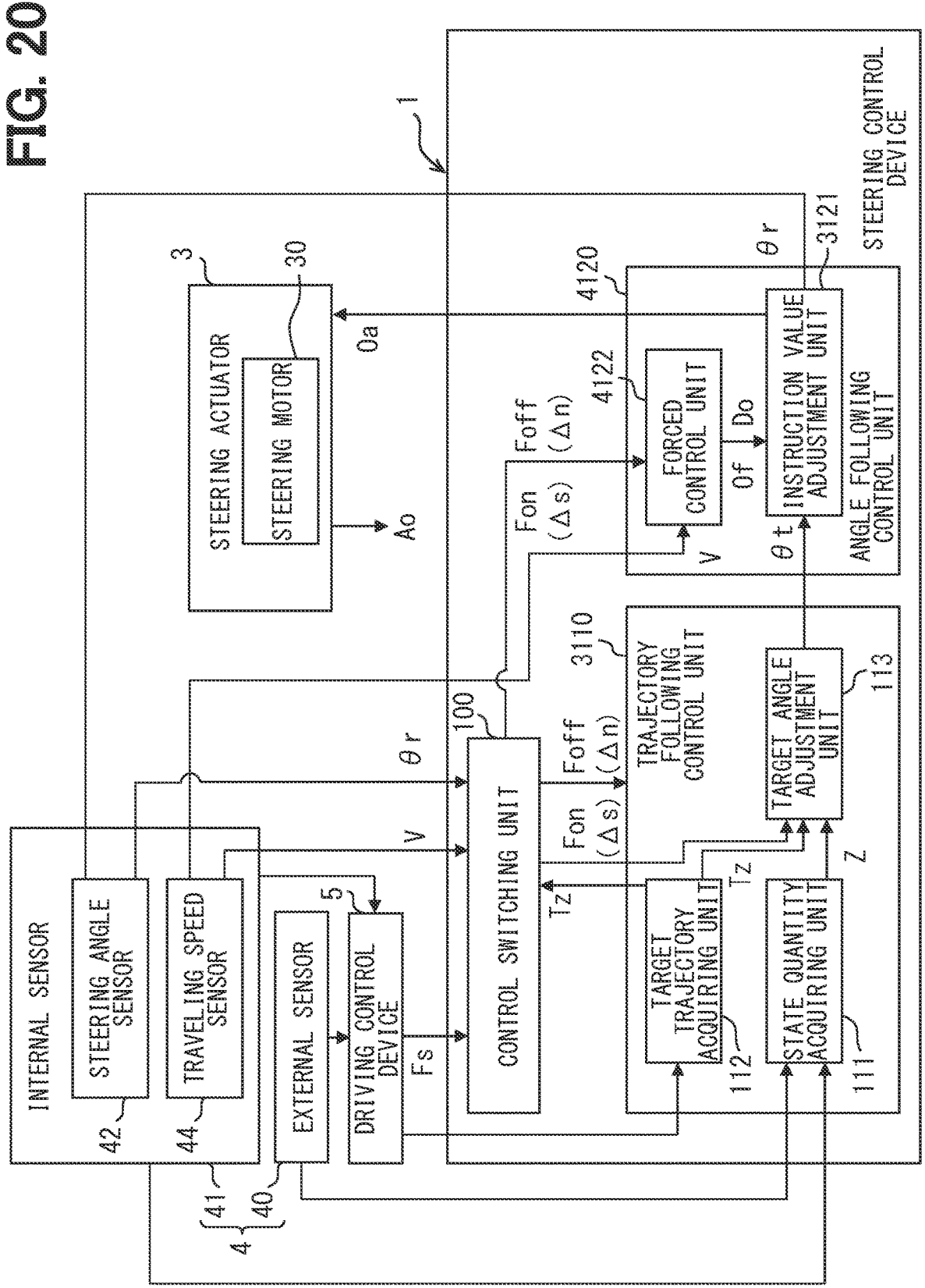
FIG. 20 is a block diagram showing a detail configuration of a steering control device according to a fourth embodiment.

A fourth embodiment shown in FIGS. 20-24 is a modification of the third embodiment. A forced control unit 4122 of an angle following control unit 4120 of the fourth embodiment shown in FIG. 20 is different from the third embodiment in the stop control in the stop control period Δs.

Figure 21:
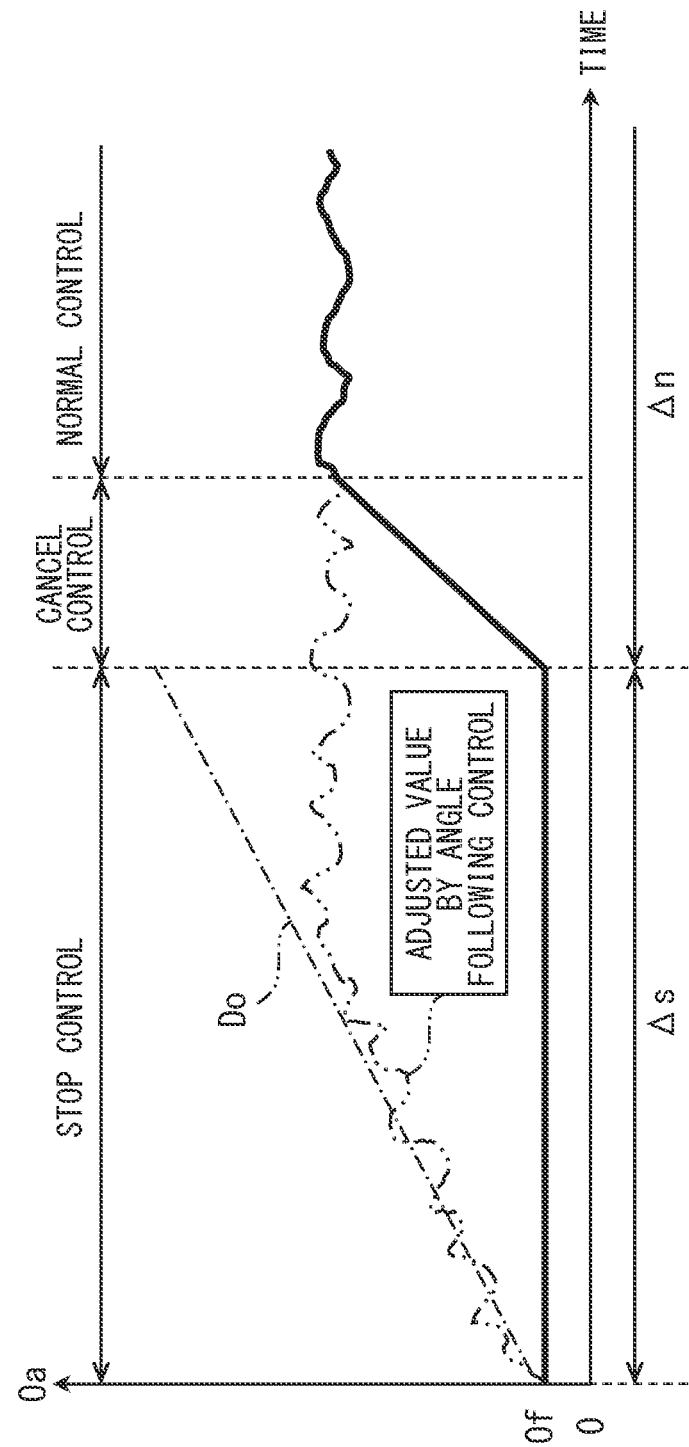
FIG. 21 is a graph for explaining an angle following control unit according to the fourth embodiment.
Figure 22:
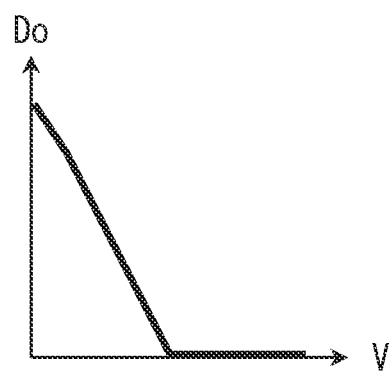
FIG. 22 is a graph for explaining the angle following control unit according to the fourth embodiment.

In the stop control, the forced control unit 4122 defines a dead zone Do in the stop control period Δs in which the on-flag Fon of the stop control is given from the control switching unit 100, as shown in FIG. 21. Therefore, the forcing control unit 4122 sets the dead zone Dθ in the stop control period Δs to both positive and negative sides as the range of values for the fixed value Of among the instruction value Oa adjusted by the angle following control of the instruction value adjustment unit 3121. As shown in FIGS. 21, 22, the forced control unit 4122 of the fourth embodiment sets wider dead zone Do as the traveling speed V acquired by the traveling speed sensor 44 decreases in the stop control period Δs. In FIGS. 21, 22, only the positive side of the instruction value Oa is shown.

When the adjusted value of the angle following control by the instruction value adjustment unit 3121 is outside the dead zone Do due to high traveling speed V in the stop control, the forced control unit 4122 adjusts the instruction value Oa given to the steering actuator 3 to be the difference between the adjusted value and the dead zone Do. The forced control unit 4122 provides the width of the dead zone Do on the same side for the positive and negative adjustment value by the angle following control for the difference calculation. When the adjusted value of the angle following control by the instruction value adjustment unit 3121 is outside the dead zone Do due to low traveling speed V in the stop control, the forced control unit 4122 converts the instruction value Oa given to the steering actuator 3 into the fixed value Of. That is, the forced control unit 4122 forcibly sets the instruction value Oa within the dead zone Do to be the fixed value Of. By switching between these readjustment and forcing processes, the instruction value Oa given to the steering actuator 3 is restrained from changing abruptly inside and outside the dead zone Dθ.

Figure 23:
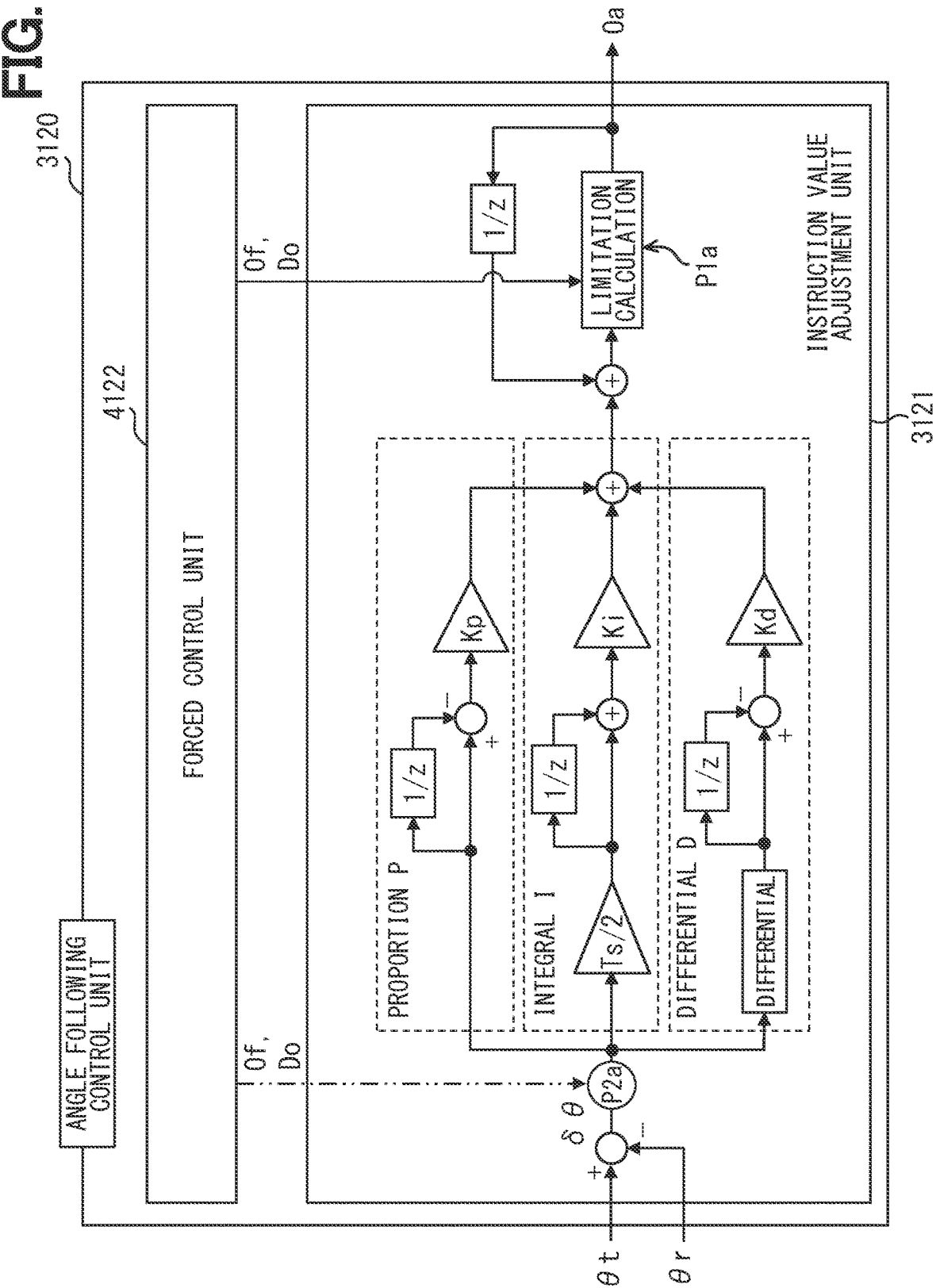
FIG. 23 is a block diagram for explaining the angle following control unit according to the fourth embodiment.

As shown in FIG. 23, the forced control unit 4122 may convert the instruction value Oa within the dead zone Do into the fixed value Of by fixing a predetermined control variable in the PID control performed by the instruction value adjustment unit 3121. One of the control points P1a, P2a is selected as the variable fixing point in the PID control as in the third embodiment.

During the normal control period Δn in which the off-flag of the stop control is given from the control switching unit 100, the forced control unit 4122 performs the normal control after performing the release control as in the third embodiment.

Figure 24:
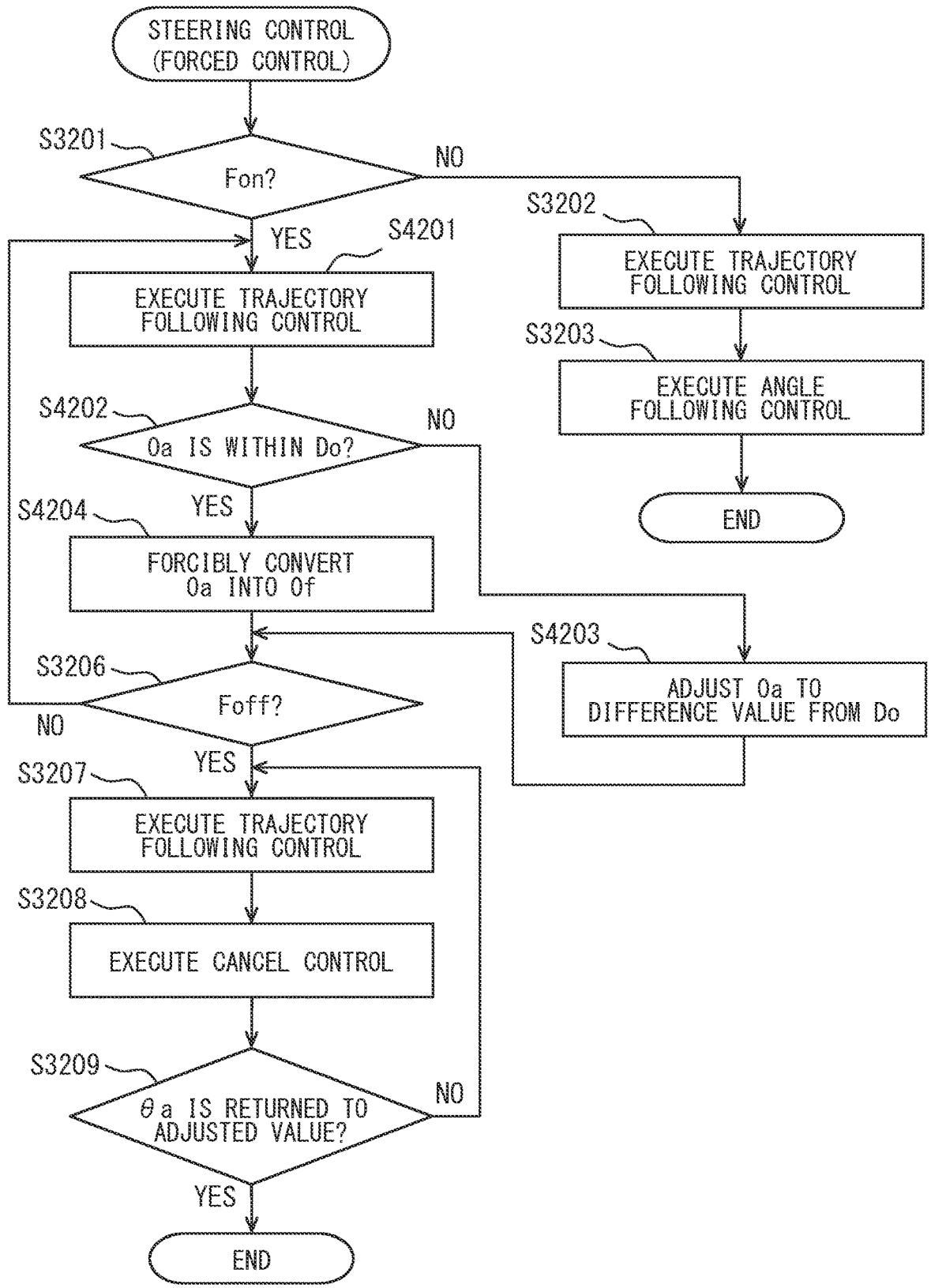
FIG. 24 is a flowchart illustrating a steering control method according to the fourth embodiment.

The control switching flow in the steering control flow of the fourth embodiment is the same as the first and third embodiments. In contrast, the forced control flow in the steering control flow of the fourth embodiment is different from the third embodiment as shown in FIG. 24.

In S4201, the target angle adjustment unit 113 performs the trajectory following control to cause the state quantity Z to follow the target trajectory Tz, and thus adjusts the target angle θt given to the angle following control unit 4120. However, in subsequent S4202, the forced control unit 4122 determines whether the instruction value Oa by the angle following control according to the angle adjusted by the instruction value adjustment unit 3121 is within the dead zone Do according to the traveling speed V for controlling the instruction value Oa regardless of the adjusted angle in S4201.

When the negative determination is made in S4201, the forced control flow proceeds to S4203. In S4203, the forced control unit 4122 readjusts the instruction value Oa, which was adjusted by the angle following control of the instruction value adjustment unit 3121 to be a value outside the dead zone Do, to the difference value from the dead zone Do.

When the positive determination is made in S4201, the forced control flow proceeds to S4204. In S4204, the forced control unit 4122 forcibly converts the instruction value Oa, which was adjusted by the angle following control of the instruction value adjustment unit 3121 to be a value within the dead zone Do, into the fixed value Of.

Subsequent to one of S4203 and S4204, the forced control flow proceeds to S3206 as in the third embodiment. When the negative determination is made, the flow returns to S4201. When the positive determination is made, S3207-S3209 are performed as in the third embodiment.

In the fourth embodiment described above, S3202, S4201, S3207 correspond to a trajectory following control process, and S3201, S3203, S4202-S4204, S3206, S3208, S3209 correspond to an angle following control process.

Operation Effects

The description below explains the operation and effect of the above-described fourth embodiment mainly regarding differences from the first embodiment.

According to the fourth embodiment, in the dead zone Do set in the stop control period Δs, the instruction value Oa is converted into the fixed value Of. According to this, the actual angle θr corresponding to the fixed value Of within the dead zone Do is given from the steering actuator 3 to the steering tire 20, and thus the change of the steering angle θ which is the actual angle θr can be limited. Therefore, it is possible to suppress, using the dead zone Do, the discomfort felt by the occupants due to the change of the steering angle θ in the stopped vehicle 2.

According to the fourth embodiment, in the dead zone Do which is set to be wider as the traveling speed V of the vehicle 2 decreases in the stop control period Δs, the instruction value Oa is converted into the fixed value Of. According to this, the change of the steering angle θ, which is the actual angle θr corresponding to the instruction value Oa which is likely to be forced to the fixed value Of as the traveling speed V decreases due to the stop of the vehicle 2, is likely to be suppressed as the traveling speed V decreases. Therefore, it is possible to suppress, using the dead zone Do, the discomfort felt by the occupants due to the change of the steering angle θ in the stopped vehicle 2.

Other Embodiments

Although a plurality of embodiments have been described above, the present disclosure is not to be construed as being limited to these embodiments, and can be applied to various embodiments and combinations within a scope not deviating from the gist of the present disclosure.

The dedicated computer of the steering control device 1 in a modification example may be at least one outside center computer communicating with the vehicle 2. The dedicated computer of the steering control device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In S101 performed by the control switching unit 100 of a modification example, one of the speed condition Cs1 and the steering condition Cs2 which are the starting condition for the stop control period Δs may be omitted. In S103 performed by the control switching unit 100 of a modification example, one or two of the speed condition Cr1, the steering condition Cr2, and the trajectory condition Cr3 which are the release conditions for the stop control period Δs may be omitted.

In S207 performed by the forced control unit 114, 2114 of a modification example, instead of performing the release control, the target angle θt given to the angle following control unit 120 may be controlled to be the angle adjusted by the target angle adjustment unit 113. In this case, S209 by the forced control unit 114, 2114 may be omitted. In S3208 performed by the forced control unit 3122, 4122 of a modification example, instead of performing the release control, the instruction value Oa given to the steering actuator 3 may be controlled to be the value adjusted by the instruction value adjustment unit 3121. In this case, S3209 by the forced control unit 3122, 4122 may be omitted.

In S2201 performed by the forced control unit 2114 of a modification example, instead of the dead zone Dθ according to the traveling speed V, the dead zone Dθ may be set to be wider as the elapsed time from the starting timing of the stop control period Δs increases. In S4202 performed by the forced control unit 4122 of a modification example, instead of the dead zone Do according to the traveling speed V, the dead zone Do may be set to be wider as the elapsed time from the starting timing of the stop control period Δs increases.

What is claimed is:

1. A steering control device configured to control steering of a vehicle by a steering actuator, the steering actuator configured to apply a torque to a tire of the vehicle which adjusts a steering angle of the tire, the steering control device comprising:
    a trajectory following control unit configured to adjust a target angle of the steering angle based on a trajectory following control that causes a state quantity containing a position of the vehicle to follow a target trajectory; and
    an angle following control unit configured to adjust an instruction value that is given to the steering actuator based on an angle following control that causes an actual angle of the steering angle of the tire to follow the target angle, wherein
    the trajectory following control unit is configured to forcibly set the target angle to be a fixed angle in a stop control period which starts in response to a stop of the vehicle.

2. The steering control device according to claim 1, wherein
    the trajectory following control unit is configured to keep the target angle at the fixed angle during the stop control period.

3. The steering control device according to claim 1, wherein
    the trajectory following control unit is configured to convert the target angle within a dead zone set in the stop control period into the fixed angle.

4. The steering control device according to claim 3, wherein
    the dead zone is wider as a traveling speed of the vehicle decreases in the stop control period.

5. The steering control device according to claim 1, wherein
    the trajectory following control unit is configured to release the stop control period when the tire is steered in the stop control period.

6. The steering control device according to claim 1, wherein
    the trajectory following control unit is configured to release the stop control period when a deviation between the target trajectory and an estimated trajectory according to the actual angle is expected in the stop control period.

7. The steering control device according to claim 1, wherein
    the trajectory following control unit is configured to, in response to a release of the stop control period, change the target angle from the fixed angle to an angle adjusted by the trajectory following control.

8. A steering control device configured to control steering of a vehicle by a steering actuator, the steering actuator configured to apply a torque to a tire of the vehicle which adjusts a steering angle of the tire, the steering control device comprising:
    a trajectory following control unit configured to adjust a target angle of the steering angle based on a trajectory following control that causes a state quantity containing a position of the vehicle to follow a target trajectory; and
    an angle following control unit configured to adjust an instruction value that is given to the steering actuator based on an angle following control that causes an actual angle of the steering angle of the tire to follow the target angle, wherein the angle following control unit is configured to forcibly set the instruction value to be a fixed value in a stop control period which starts in response to a stop of the vehicle.

9. The steering control device according to claim 8, wherein the angle following control unit is configured to keep the instruction value at the fixed value during the stop control period.

10. The steering control device according to claim 8, wherein the angle following control unit is configured to convert the instruction value within a dead zone set in the stop control period into the fixed value.

11. The steering control device according to claim 10, wherein the dead zone is wider as a traveling speed of the vehicle decreases in the stop control period.

12. The steering control device according to claim 8, wherein the angle following control unit is configured to release the stop control period when the tire is steered in the stop control period.

13. The steering control device according to claim 8, wherein the angle following control unit is configured to release the stop control period when a deviation between the target trajectory and an estimated trajectory according to the actual angle is expected in the stop control period.

14. The steering control device according to claim 8, wherein the angle following control unit is configured to, in response to a release of the stop control period, change the instruction value from the fixed value to a value adjusted by the angle following control.

15. A steering control method for controlling steering of a vehicle by a steering actuator, the steering actuator configured to apply a torque to a tire of the vehicle which adjusts a steering angle of the tire, the steering control method comprising:

adjusting a target angle of the steering angle based on a trajectory following control that causes a state quantity containing a position of the vehicle to follow a target trajectory; and adjusting an instruction value that is given to the steering actuator based on an angle following control that causes an actual angle of the steering angle of the tire to follow the target angle, wherein in the adjusting the target angle, the target angle is forcibly set to be a fixed angle in a stop control period which starts in response to a stop of the vehicle.

16. The steering control method according to claim 15, wherein in the adjusting the target angle, the target angle is kept at the fixed angle during the stop control period.

17. The steering control method according to claim 15, wherein in the adjusting the target angle, the target angle within a dead zone set in the stop control period is converted into the fixed angle.

18. The steering control method according to claim 17, wherein the dead zone is wider as a traveling speed of the vehicle decreases in the stop control period.

19. The steering control method according to claim 15, wherein in the adjusting the target angle, the stop control period is released when the tire is steered in the stop control period.

20. The steering control method according to claim 15, wherein in the adjusting the target angle, the stop control period is released when a deviation between the target trajectory and an estimated trajectory according to the actual angle is expected in the stop control period.

21. The steering control method according to claim 15, wherein in the adjusting the target angle, the target angle is changed from the fixed angle to an angle adjusted by the trajectory following control in response to a release of the stop control period.

22. A steering control method for controlling steering of a vehicle by a steering actuator, the steering actuator configured to apply a torque to a tire of the vehicle which adjusts a steering angle of the tire, the steering control method comprising:

adjusting a target angle of the steering angle based on a trajectory following control that causes a state quantity containing a position of the vehicle to follow a target trajectory; and adjusting an instruction value that is given to the steering actuator based on an angle following control that causes an actual angle of the steering angle of the tire to follow the target angle, wherein in the adjusting the instruction value, the instruction value is forcibly set to be a fixed value in a stop control period which starts in response to a stop of the vehicle.

23. The steering control method according to claim 22, wherein in the adjusting the instruction value, the instruction value is kept at the fixed value during the stop control period.

24. The steering control method according to claim 22, wherein in the adjusting the instruction value, the instruction value within a dead zone set in the stop control period is converted into the fixed value.

25. The steering control method according to claim 24, wherein the dead zone is wider as a traveling speed of the vehicle decreases in the stop control period.

26. The steering control method according to claim 22, wherein in the adjusting the instruction value, the stop control period is released when the tire is steered in the stop control period.

27. The steering control method according to claim 22, wherein in the adjusting the instruction value, the stop control period is released when a deviation between the target trajectory and an estimated trajectory according to the actual angle is expected in the stop control period.

28. The steering control method according to claim 22, wherein in the adjusting the instruction value, the instruction value is changed from the fixed value to a value adjusted by the angle following control in response to a release of the stop control period.

* * * * *